(12) United States Patent
Hill et al.

(10) Patent No.: US 6,201,609 B1
(45) Date of Patent: Mar. 13, 2001

(54) INTERFEROMETERS UTILIZING POLARIZATION PRESERVING OPTICAL SYSTEMS

(75) Inventors: Henry Allen Hill, Tucson, AZ (US); Peter J. de Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 09/384,855

(22) Filed: Aug. 27, 1999

(51) Int. Cl.[7] ....................................................... G01B 9/02
(52) U.S. Cl. ............................................................ 356/491
(58) Field of Search .............................. 356/351; 359/529

(56) References Cited

U.S. PATENT DOCUMENTS

| | | | |
|---|---|---|---|
| 3,450,476 | * 6/1969 | Rando | 356/107 |
| 3,984,153 | 10/1976 | Zanoni . | |
| 4,688,940 | 8/1987 | Sommargren et al. . | |
| 4,740,986 | * 4/1988 | Reeder | 372/92 |
| 4,824,251 | * 4/1989 | Slotwinski et al. | 356/349 |
| 4,859,066 | 8/1989 | Sommargren . | |
| 4,881,815 | 11/1989 | Sommargren . | |
| 4,881,816 | 11/1989 | Zanoni . | |
| 4,883,357 | 11/1989 | Zanoni . | |
| 5,398,112 | * 3/1995 | Ai et al. | 356/359 |
| 5,684,630 | 11/1997 | Arai . | |
| 5,973,864 | * 10/1999 | Lehmann et al. | 359/834 |

OTHER PUBLICATIONS

Lees, David and Baumeister, Philip, "Versatile frustrated–total–reflection polarizer for the infrared", Optics Letters, vol. 4, No. 2, Feb. 1979.
Zanoni, C., "Differential Interferometer Arrangements for Distance and Angle Measurements: Principles, Advantages and Applications", VDI Berichte NR 749, 1989.
Lotem, Haim and Rabinovitch, Kopel, "Penta prism laser polarizer", Applied Optics, vol. 32, No. 12, Apr. 20, 1993.

* cited by examiner

Primary Examiner—Robert Kim
Assistant Examiner—Phil Natividad
(74) Attorney, Agent, or Firm—Francis J. Craufield

(57) ABSTRACT

Interferometers utilizing polarization preserving optical systems by plane polarized beams are deviated through preselected angles without changing their linear state of polarization. The interferometers utilizing such optical systems have a variety of applications and are particularly suitable for use in the field of distance measuring interferometry (DMI) to enhance measurement accuracy by reducing undesirable polarization effects that can introduce errors associated with an otherwise present undesirable polarization rotation found in classical retroreflectors. Prismatic optical elements are preferably used to construct assemblies which can include polarization beam splitting coating arrangements and/or birefringent materials to enhance the extinction ratio between orthogonally polarized beams propagating through such systems.

54 Claims, 25 Drawing Sheets

GENERALIZED RETROREFLECTION

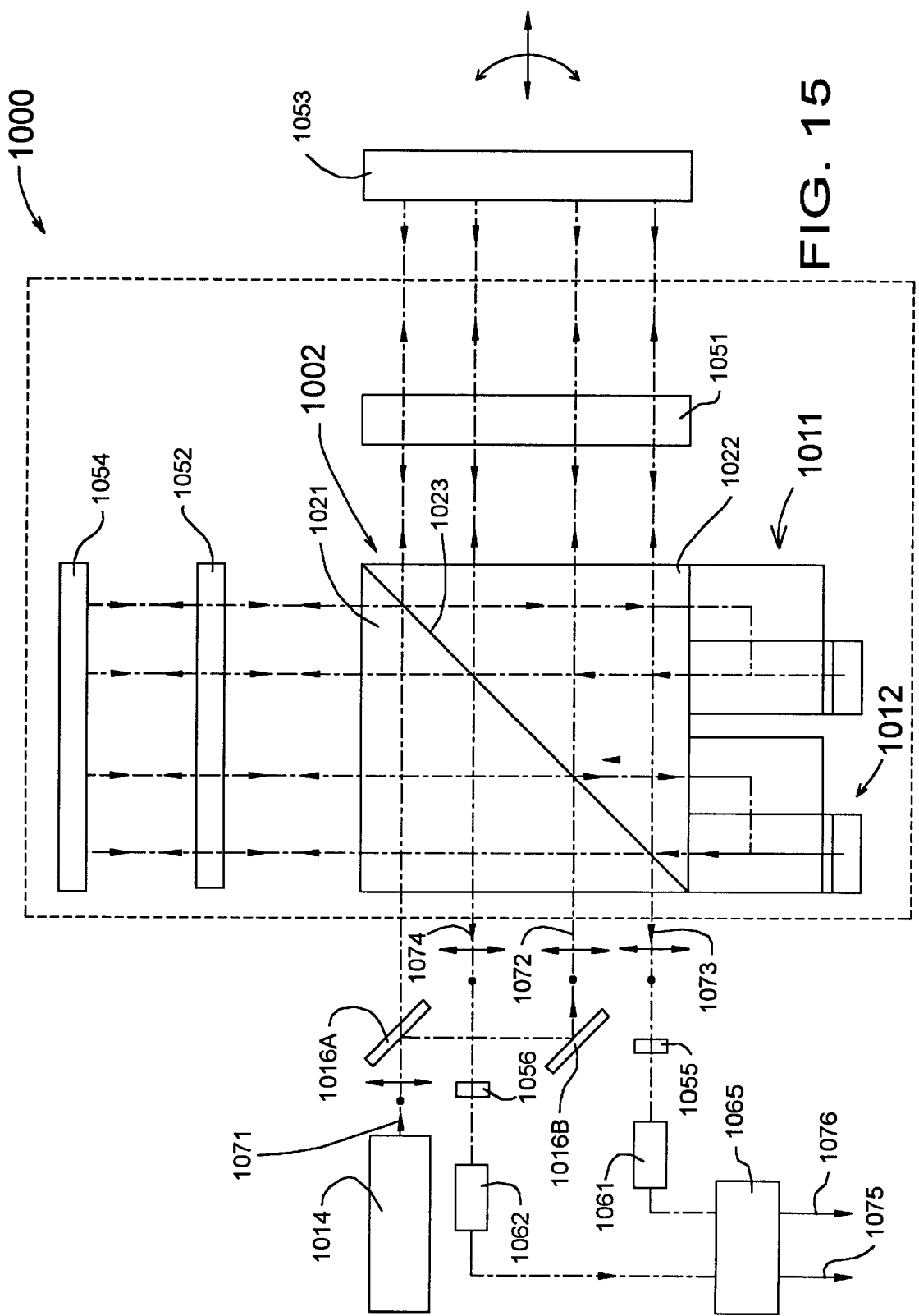

INTERFEROMETERS UTILIZING POLARIZATION PRESERVING OPTICAL SYSTEMS

CROSS REFERENCE TO RELATED APPLICATION

This application is related to commonly owned, copending U.S. patent application Ser. No. 09/384,742 filed on even date herewith in the name of Henry Allen Hill and entitled POLARIZATION PRESERVING OPTICAL SYSTEMS.

BACKGROUND OF THE INVENTION

This invention in general relates to displacement measurement interferometry and more particularly to displacement measurement interferometers (DMIS) that utilize polarization preserving optical systems to enhance their accuracy by reducing undesirable polarization effects.

In polarization interferometers for the measurement of linear and angular displacements, one or more orthogonally polarized beams are introduced into the interferometer and then are separated by a polarizing beam splitter for travel along reference and measurement legs. Afterwards, the beams are recombined and information about the difference in the optical path lengths they traveled is analyzed to yield displacement. In the process of traveling through the interferometer, perhaps making multiple passes, the polarized beams typically encounter retroreflectors that return them from either fixed or moveable mirrors. Such retroreflectors, which are non- polarization preserving, introduce errors in the accuracy of the measurements obtainable because they do not preserve the state of polarization of the beams to a degree consistent with the demands for high accuracy.

Such non-polarization preserving retroreflectors are well-known and operate to deflect light through 180 degrees such that an incoming beam is exactly reversed in direction, traveling as an outgoing beam parallel to the direction of propagation of the incoming direction and spatially offset with respect to it. The classical retroreflector essentially contains the intersection corner of three mutually perpendicular plane surfaces and is known as the cube corner retroreflector or sometimes the tetrahedron. Here, a ray generally undergoes 3 reflections, one from each 120° sector in the process of entering and exiting the retroreflector. Ideally, the direction of the reflected ray is opposite that of the incident ray but displaced due to a reflection through the retroreflector intersection corner. From the standpoint of polarization effects, the primary problem with the classical retroreflector is that the angles the rays make with the mirror surfaces are skew. Detailed calculations using the Jones matrix formalism, along with the Fresnel reflection formulas, can be used to predict the resultant polarization for different initial polarizations and retroreflector types. From the standpoint of their use in DMI applications where small, linearly polarized beams interact with only small subapertures of the retroreflector, the net effect is to rotate the plane of polarization by several degrees (typically 6°). This phenomenon is called Retro Induced Polarization Rotation (RIPR) and misaligns the beam polarization directions with respect to the polarization beam splitter of the interferometer which can cause large periodic errors in the measured interferometric phase. A particularly troublesome periodic or "cyclic" error which occurs in High Stability Plane Mirror Interferometers (HSPMI) produces an error with a frequency at ½ the Doppler shift (as well as other frequencies). It has been shown that this error, which is due to the polarization rotation properties of the retroreflector, can be extremely large and will occur regardless of the beamsplitter quality.

Consequently, it is a primary object of the present invention to provide polarization interferometers utilizing polarization preserving optical systems that provide beam deflection properties without introducing deleterious polarization effects.

It is another object of the present invention to provide displacement measurement interferometers that use polarization preserving optical systems in place of traditional cube corner retroreflectors.

Yet another object of the invention to provide polarization plane mirror interferometers that utilize polarization preserving optical systems to enhance displacement measurement accuracy.

It is still another object of the present invention to provide polarization plane mirror interferometers that utilize internally tilted surfaces for purposes of reducing the effects of undesirable ghost beams on accuracy.

It is yet another object of the present invention to provide polarization plane mirror interferometers that utilize retardation elements in one or more interferometer legs to reduce the effects of ghost images.

Yet another object of the present invention is to provide polarization preserving optical systems for use at multiple wavelengths.

It is yet another object of the present invention to provide multiple-pass (two or more) polarization plane mirror interferometers that utilize polarization preserving optical systems.

Other objects of the invention will, in part, be obvious and will, in part, appear hereinafter when the following detailed description is read in connection with the accompanying drawings.

SUMMARY OF THE INVENTION

The present invention relates to polarization interferometric apparatus that utilize polarization preserving optical systems to deviate plane polarized beams through preselected angles without changing their linear state of polarization. The inventive polarization interferometric apparatus have a variety of applications and are particularly suitable for use in distance measuring interferometry (DMI) to achieve higher measurement accuracy than is otherwise possible. This is achieved by reducing undesirable polarization effects that can introduce errors associated with an otherwise present undesirable polarization rotation found in classical retroreflectors. Such interferometers find additional utility in the fabrication of integrated circuits via microlithographic techniques.

While a number of embodiments of the polarization interferometric apparatus of the invention are described, they all share in common the use of interferometer means for receiving at least two beams having orthogonal states of polarization and providing first and second interferometer legs, separating the two beams for travel along the first and second interferometer legs, respectively, and generating exit beams containing information about the respective differences in the optical paths each beam experienced in traveling the first and second interferometer legs. The first and second interferometer legs have optical paths structured and arranged such that at least one of them has a variable physical length, and the optical path length difference between the first and second interferometer legs varies in accordance with the difference between the respective physical lengths of their optical paths and wherein at least one of the first and second interferometer legs comprises a polarization preserving optical system.

The polarization preserving optical systems used in the polarization interferometric apparatus of the invention comprise a plurality of reflecting surfaces arranged such that a change in the direction of propagation of an input beam, normal to both the input beam and an output beam, causes a change in the direction of propagation of the output beam in a direction opposite to the direction of the change in the input beam, and a change in the direction of propagation of the input beam, normal to the input beam and in a plane orthogonal to a normal to both the input beam and the output beam, causes a rotation in the output beam in the plane that is the same as a corresponding rotation of the input beam caused by the change in the direction of propagation of the input beam and wherein the plane of incidence at each of the reflecting surfaces is either orthogonal or parallel to the plane of polarization of an incident beam thereto.

The polarization preserving optical systems are preferably fabricated of a plurality of prismatic optical elements wherein the plurality of reflecting surfaces comprise selected surfaces of the prismatic optical element and preferably operate by total internal reflection.

The plurality of prismatic optical elements are preferably arranged as an integral assembly in which at least one surface of each prismatic optical element contacts at least one surface of another prismatic optical element and in which at least one polarizing beam splitter may be included.

The prismatic optical elements are selected from the group consisting of Porro, right angle, Dove, penta, and "K" prisms, one embodiment comprises a sequential combination of a right angle prism, a Porro prism, and a pentaprism.

At least one of the plurality of reflecting surfaces may have formed thereon a multilayer polarizing beam splitter coating arrangement to enhance the extinction ratio between orthogonally polarized beams entering the polarization preserving optical system and originating upstream of it, and such coatings may be structured to operate at multiple wavelengths. Birefringent materials may also be used to construct the various prismatic optical elements for similar purposes.

A variety of input to output beam relationships is demonstrated and depend on the particular design geometry of a system.

Examples of polarization interferometric apparatus in which polarization preserving optical systems are used include, but are not limited to, plane mirror, high stability plane mirror, differential plane mirror, column, and dual linear/angular interferometers.

Means are also provided for generating at least two input beams that are orthogonally polarized, may be coextensive and overlapping or be spatially separated, and may operate at more than one wavelength, which may or may not be harmonically related.

Also included are means for combining the exit beams to produce mixed optical signals containing information corresponding to the phase differences between each of the exit beams from corresponding ones of the predetermined optical paths of the first and second interferometer legs.

Further included are means for detecting the mixed optical signals and generating electrical interference signals containing information corresponding to the difference in physical path lengths of the interferometer legs and their relative rate of change, and electronic means for analyzing the electrical interference signals.

At least one of the interferometer legs preferably includes retardation elements for controlling the state of polarization of orthogonally polarized beams and reducing the effects of ghost reflections on exit beams.

The interferometer means, which typically include a plurality of opposing surfaces, preferably have at least some of them tilted with respect to others to reduce the effects of ghost beams on exit beams.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein:

FIG. 3 is a diagrammatic perspective view showing the relationship between beams entering and exiting the optical system of FIG. 1a after a change in the direction of the input beam compared with its direction in FIG. 1a, the change being in a plane that is perpendicular to the normal of FIG. 1b and the input beam of FIG. 1a;

FIG. 15 is a diagrammatic plan view of a dual high stability interferometer employing a pair of polarization preserving optical system assemblies for measuring linear and angular displacement;

FIGS. 16b through 16e are plane view of various elements of the interferometer of FIG. 16a;

FIGS. 19a–19c relate to lithography and its application to manufacturing integrated circuits wherein FIG. 19a is a schematic drawing of a lithography exposure system employing the interferometry system.

FIGS. 19b and 19c are flow charts describing steps in manufacturing integrated circuits.

DETAILED DESCRIPTION OF THE INVENTION

The present invention relates to polarization preserving optical systems and their use as components in displacement measuring interferometers. Accordingly, the structure and properties of the polarization preserving optical systems per se will first be described and then their application in displacement measuring interferometers will be taken up.

Various embodiments of the polarization preserving optical systems of the invention will be described, and each polarization preserving optical system comprises two properties. The first property that such optical systems possess is a set of orientations of planes of linear polarization for which the polarization state of an input beam at each reflecting and refracting surface of the optical system and a corresponding output beam are all linear. The set of planes of linear polarization orientations hereinafter will be referred to as eigenmodes. Thus, the optical systems "preserve", for an input beam to the system having an eigenmode state of linear polarization, the linear states of polarization of the input beam at each reflecting and refracting surface of the optical system and the corresponding output beam.

A set of the optical systems that exhibit such eigenmodes comprise reflecting and refracting surfaces such that the plane of polarization of an eigenmode at each of any reflecting or refracting surface in the optical system is either parallel to or orthogonal to the plane of incidence at the surface.

The second property that apparatus of the various embodiments described herein further possess is a certain set of transformation properties. The set of transformation properties describe a specific relationship between changes in the direction of propagation of an output beam from an optical system that results from changes in the direction of propagation an input beam where the directions of propagation of the input and output beams may or may not be parallel. This set of transformation properties will hereinafter be referred to as a transformation type $T_{Ret}$.

Figure 1A:
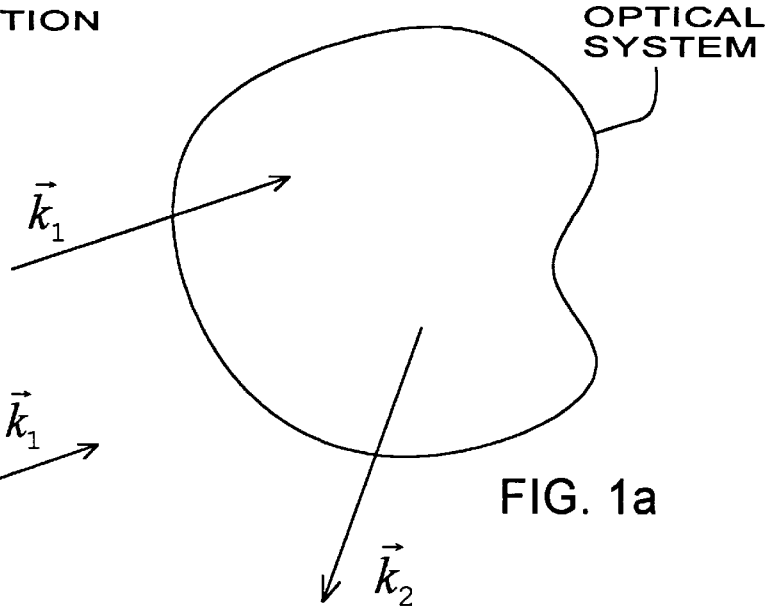
FIG. 1a is a diagrammatic perspective view showing the relationship between beams entering and exiting an optical system having generalized polarization preserving optical system properties.

FIG. 1a is a diagrammatic perspective view showing the relationship between vectors $\vec{k}_1$ and $\vec{k}_2$ representing the directions of propagation of optical beams entering and exiting, respectively, an optical system exhibiting transformation properties of the transformation type $T_{Ret}$. The magnitudes of input and output vectors, $|\vec{k}_1|$ and $|\vec{k}_2|$, respectively, are equal to respective wavenumbers $k_i = 2\pi/\lambda_i$ for i=1 and 2 where $\lambda_i$ is the wavelength of a respective vector.

The transformation properties of the transformation type $T_{Ret}$ are defined in terms of infinitesimal changes $\Delta\vec{k}_1$ and corresponding infinitesimal changes $\Delta \vec{k}_2$ in vectors $\vec{k}_1$ and $\vec{k}_2$, respectively, to form vectors $\vec{k}_1$ and $\vec{k}_2$, respectively, wherein infinitesimal changes $\Delta \vec{k}_1$ and $\Delta \vec{k}_2$ are orthogonal to vectors $\vec{k}_1$ and $\vec{k}_2$, respectively, $|\vec{k}_1|=|\vec{k}_1|$, and $|\vec{k}_2|=|\vec{k}_2|$. Thus, the infinitesimal changes $\Delta \vec{k}_1$ and $\Delta \vec{k}_2$ produce rotations of $\vec{k}_1$ and $\vec{k}_2$, respectively, about axes orthogonal to $\vec{k}_1$ and $\vec{k}_2$, respectively.

An arbitrary infinitesimal change $\Delta \vec{k}_1$ can be represented as the sum of two orthogonal infinitesimal vector components $\Delta \vec{k}_{1\|}$ and $\Delta \vec{k}_{1\perp}$. Component $\Delta \vec{k}_{1\|}$ is defined as a component parallel to a unit vector â. Unit vector â is defined as a vector cross product, $\vec{k}_1 \times \vec{k}_2$, of $\vec{k}_1$ and $\vec{k}_2$ normalized by the magnitude, $|\vec{k}_1 \times \vec{k}_2|$, of $\vec{k}_1 \times \vec{k}_2$, i.e.

$$\hat{a} = \frac{\vec{k}_1 \times \vec{k}_2}{|\vec{k}_1 \times \vec{k}_2|}. \qquad (1)$$

Figure 1B:
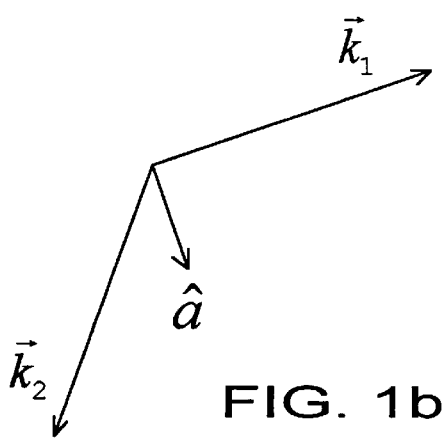
FIG. 1b is a diagrammatic perspective view showing the relationship between the input and output beams shown in FIG. 1a and a vector normal to both.
Figure 1C:
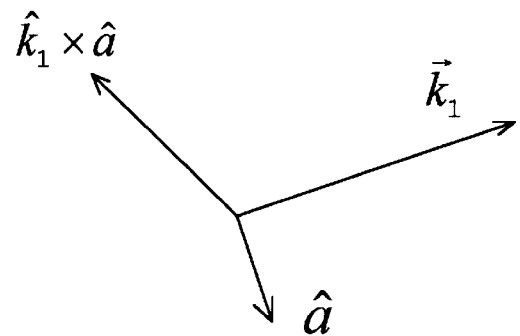
FIG. 1c is a diagrammatic perspective view showing the relationship between the input beam of FIG. 1a, the normal vector of FIG. 1b, and a vector normal to both.
Figure 2:
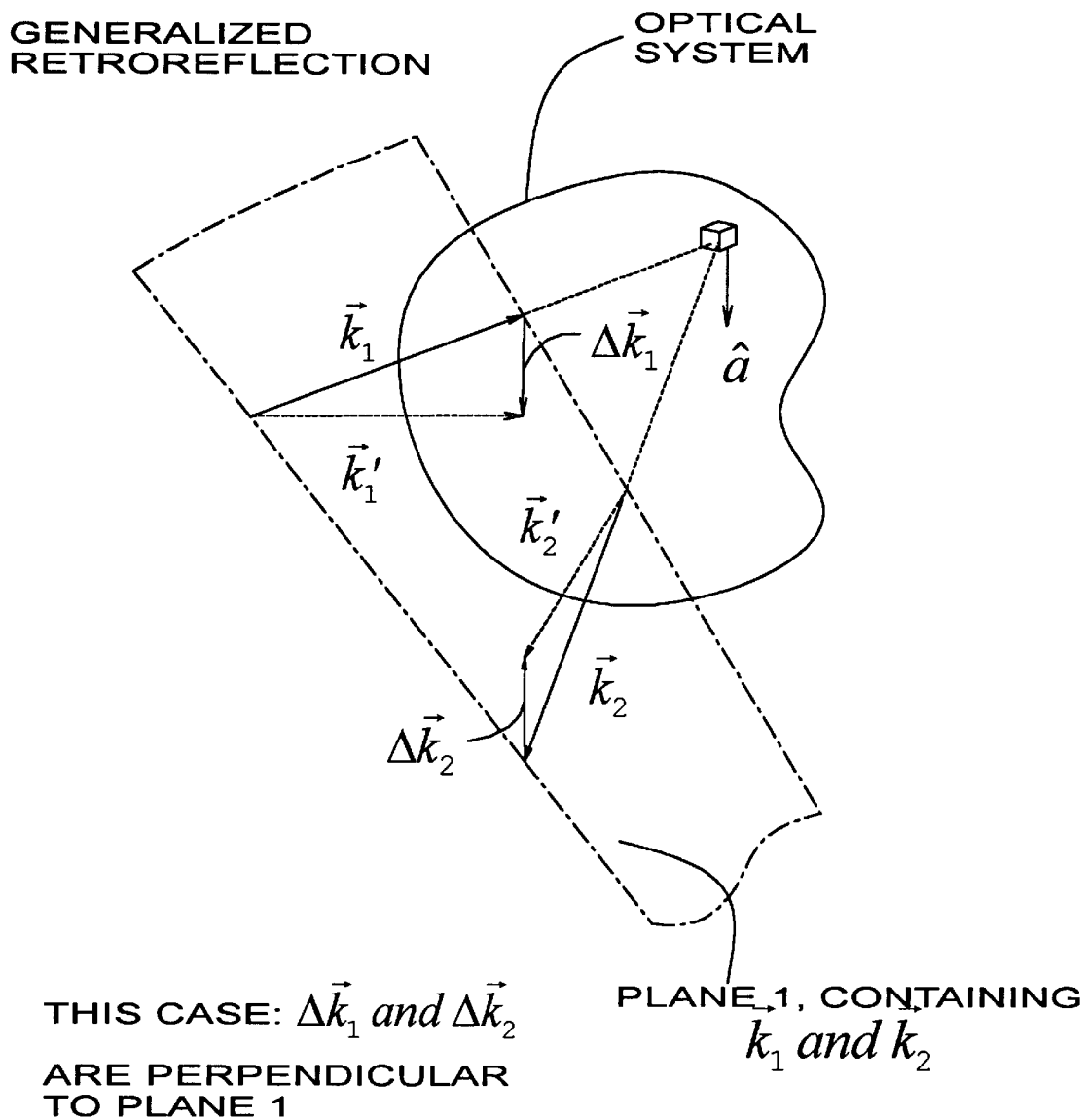
FIG. 2 is a diagrammatic perspective view showing the relationship between beams entering and exiting the optical system of FIG. 1a after a change in the direction of the input beam compared with its direction in FIG. 1a, the change being parallel to the normal of FIG. 1b.
Figure 3:
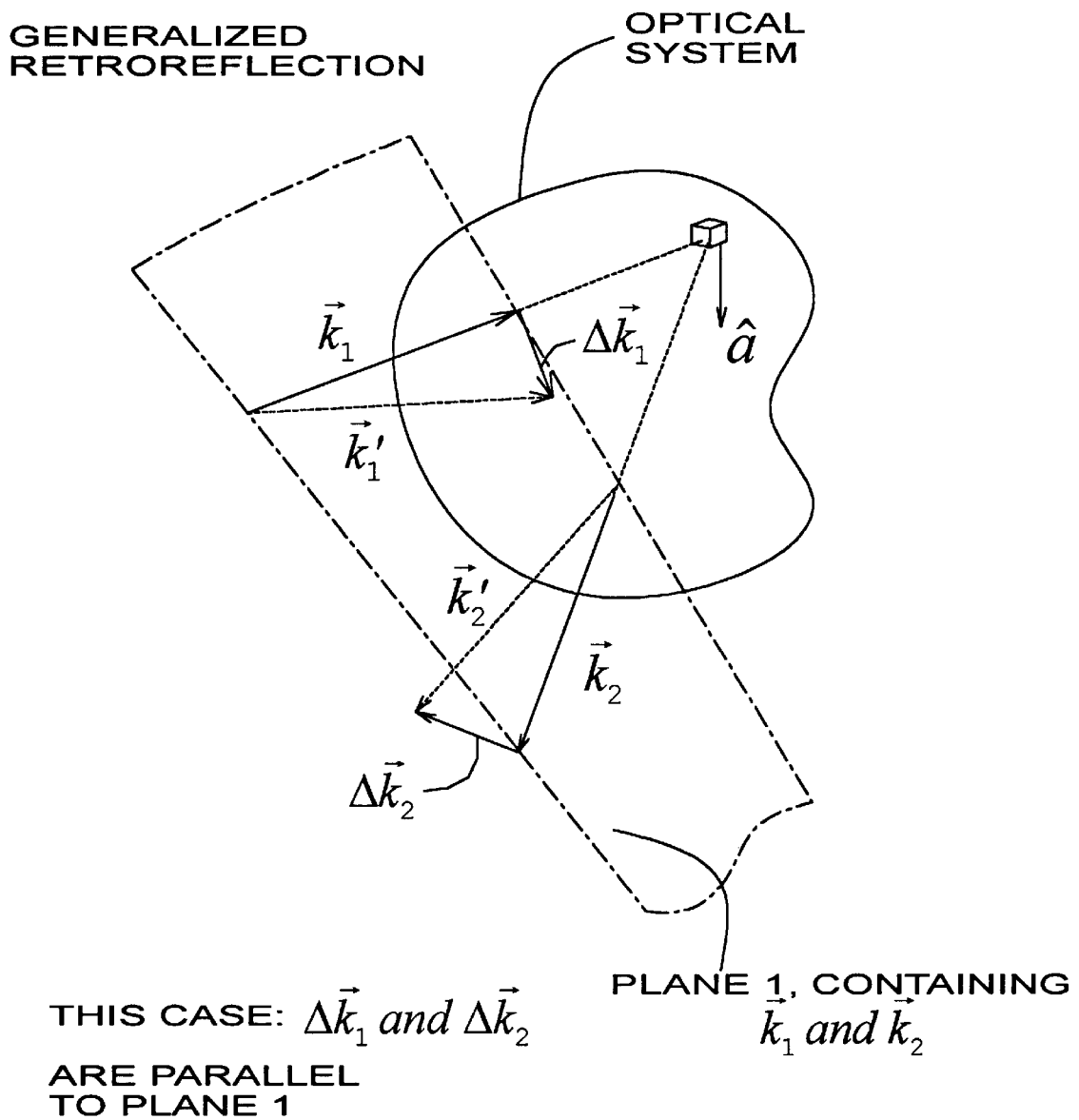

The relationship of vectors $\vec{k}_1$, $\vec{k}_2$, and â is shown in a diagrammatic perspective view in FIG. 1b. Component $\Delta \vec{k}_{1\perp}$ is orthogonal to $\vec{k}_1$ and orthogonal to unit vector â, i.e. parallel to $\hat{k}_1 \times \hat{a}$ where $\hat{k}_1 = \vec{k}_1/k_1$. The relationship of vectors $\vec{k}_1$, â, and $\hat{k}_1 \times \hat{a}$ is shown in a diagrammatic perspective view in FIG. 1c. $\Delta \vec{k}_{1\|}$ and $\Delta \vec{k}_{1\perp}$ are shown in diagrammatic perspective views in FIGS. 2 and 3, respectively.

Figure 1D:
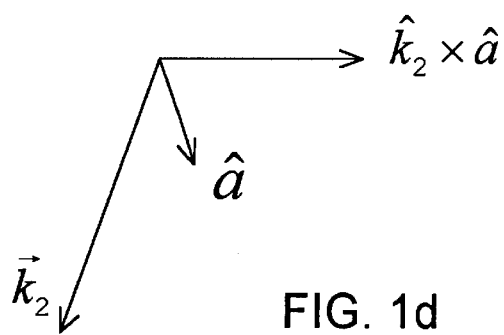
FIG. 1d is a diagrammatic perspective view showing the relationship between the output beam of FIG. 1a, the normal vector of FIG. 1b, and a vector normal to both.

Infinitesimal changes $\Delta \vec{k}_{2\|}$, and $\Delta \vec{k}_{2\perp}$ corresponding to infinitesimal changes $\Delta \vec{k}_{1\|}$ and $\Delta \vec{k}_{1\perp}$, respectively, have the following properties for the optical system exhibiting the type $T_{Ret}$ transformation properties:

(1) $\Delta \vec{k}_{2\|}$ is parallel to vector â and has a direction opposite to that of $\Delta \vec{k}_{1\|}$ and (2) $\Delta \vec{k}_{2\perp}$ is orthogonal to both $\vec{k}_2$ and unit vector â, i.e. parallel to $\hat{k}_2 \times \hat{a}$, $\hat{k}_2 = \vec{k}_2/k_2$, with the additional condition that the direction of $\Delta \vec{k}_{2\perp} \times \vec{k}_2$ is the same as the direction of $\Delta \vec{k}_{1\perp} \times \vec{k}_1$. The relationship of vectors $\vec{k}_2$, â, and $\hat{k}_2 \times \hat{a}$ is shown in a diagrammatic perspective view in FIG. 1d. The relationship of vectors $\Delta \vec{k}_{1\|}$ and $\Delta \vec{k}_{2\|}$ is shown in a diagrammatic perspective view in FIG. 2. The relationship of vectors $\Delta \vec{k}_{1\perp}$ and $\Delta \vec{k}_{2\perp}$ is shown in a diagrammatic perspective view in FIG. 3.

The first embodiment of an optical system in accordance with the present invention exhibits both polarization preserving eigenmodes and the type $T_{Ret}$ transformation properties. The first embodiment is shown as a diagrammatic perspective view in FIG. 4 where it is designated generally at 10. Optical system 10 of the first embodiment comprises a Porro prism 20 and a right angle prism 30.

Figure 4:
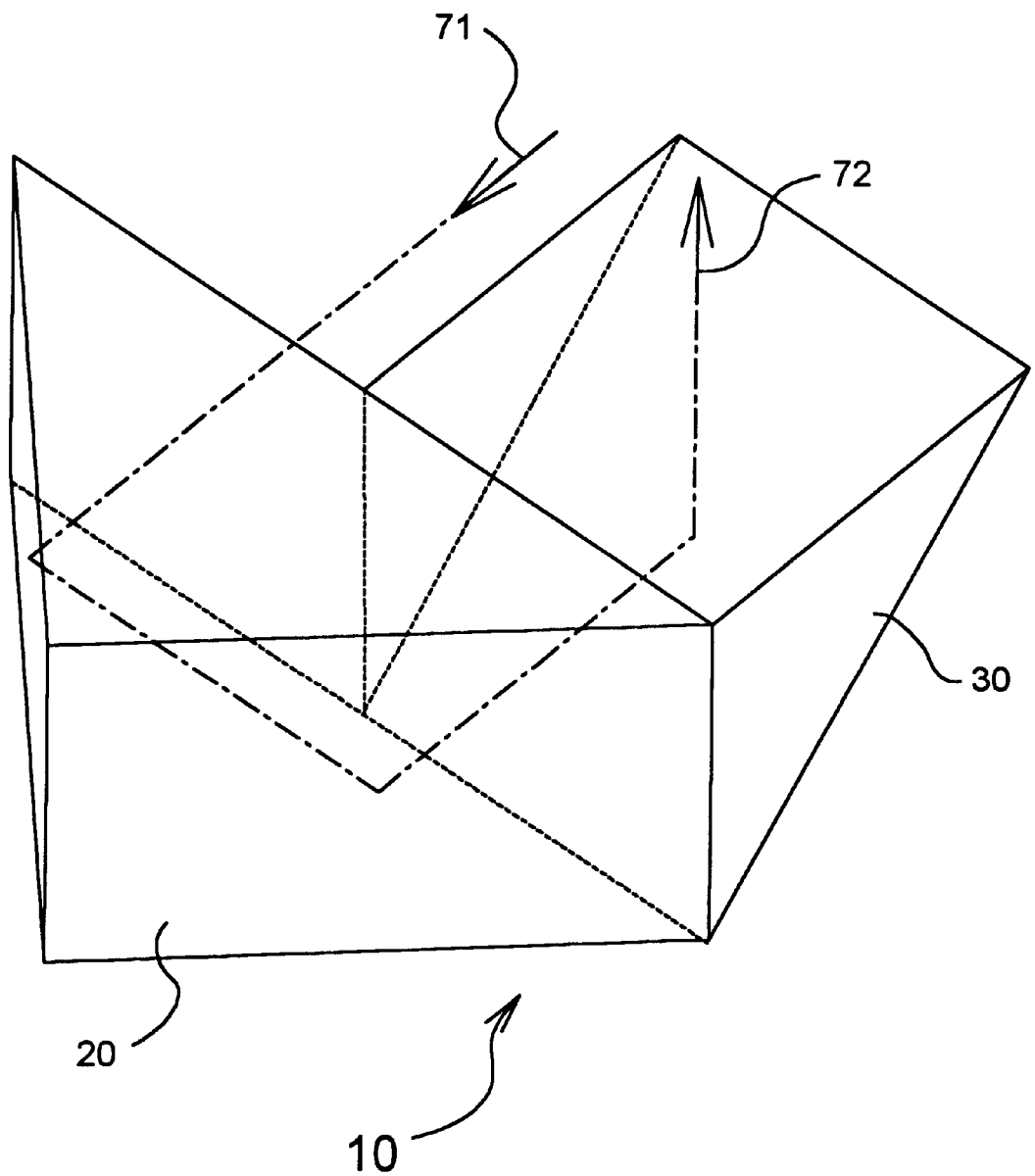
FIG. 4 is a diagrammatic perspective view of a polarization preserving generalized optical system assembly comprising a Porro prism in combination with a right angle prism along with the relationship between input and output beams as they undergo changes in the direction in which the input beam enters the face of the Porro prism, the input and output beams being offset and perpendicular to one another.

An input beam 71 enters optical system 10 and exits optical system 10 as output beam 72 (see FIG. 4). The path of input beam 71 through optical system 10 is shown in FIG. 4. Input beam 71 enters Porro prism 20 at a surface at normal incidence after which it is reflected sequentially by a first surface and then a second surface of Porro prism 20, enters right angle prism 30, is reflected by a hypotenuse surface of right angle prism 30, and exits right angle prism 30 as output beam 72 at a surface at normal incidence. The planes of incidence at the first and second surfaces of Porro prism 20 are parallel one with the other and orthogonal to the plane of incidence at the hypotenuse surface of right angle prism 30.

There are two polarization preserving eigenmodes of the first embodiment wherein the input polarization states of the two eigenmodes are parallel and orthogonal to the planes of incidence at the first and second surfaces of Porro prism 20. The corresponding output polarization states of the two polarization preserving eigenmodes are orthogonal and parallel to the plane of incidence of the hypotenuse surface of right angle prism 30, respectively. The eigenmodes are polarization preserving since the polarization states of the eigenmodes are either parallel to or orthogonal to the respective planes of incidence for each reflection and refraction in optical system 10.

The transformation properties of optical system 10 with respect to changes in direction of propagation of output 72 that result from changes in direction of propagation of input beam 71 are the same as the properties of the type $T_{Ret}$ transformation properties. This will be evident to those skilled in the art upon mapping the effects of changes in the direction of propagation of input beam 71 through optical system 10.

The second embodiment of an optical system in accordance with the present invention exhibits both polarization preserving eigenmodes and the type $T_{Ret}$ transformation properties. The second embodiment is shown as a diagrammatic perspective view in FIG. 5 where it is designated generally at 110. Optical system 110 comprises a Porro prism 120 and a trapezoid prism 130.

Figure 5:
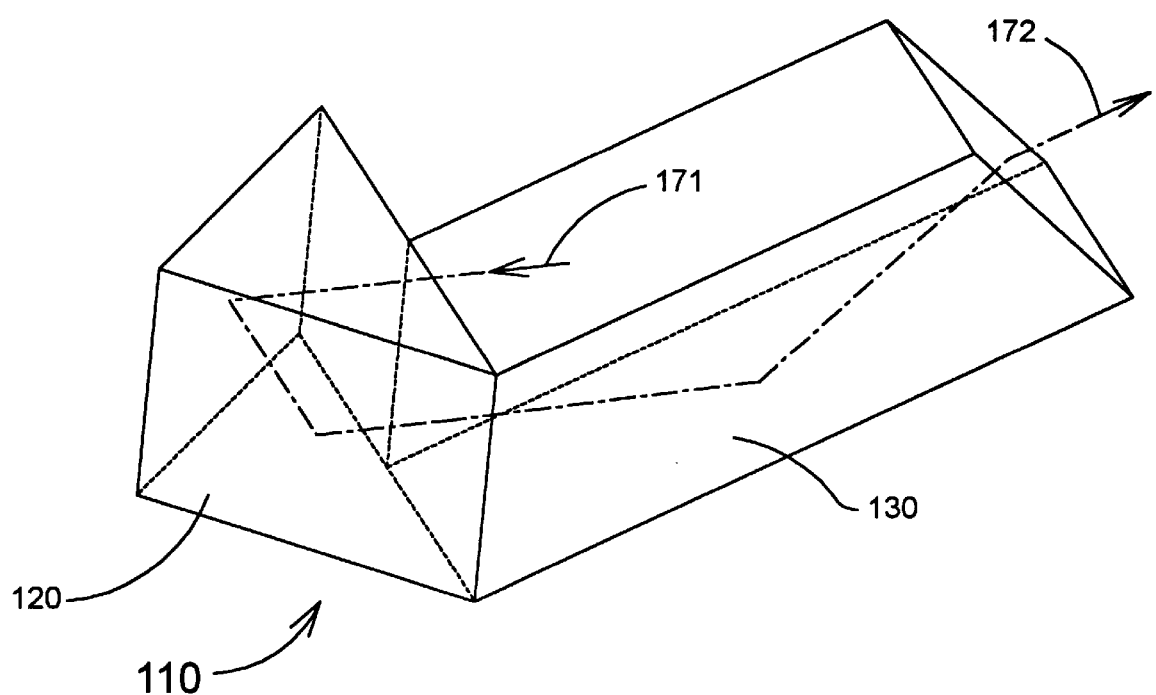
FIG. 5 is a diagrammatic perspective view of a polarization preserving generalized optical system assembly comprising a Porro prism in combination with a Dove prism along with the relationship between input and output beams as they undergo changes in the direction in which the input beam enters the face of the Porro prism, the input and output beams being offset and at other than a right angle with respect to one another.

An input beam 171 enters optical system 110 and exits optical system 110 as output beam 172 (see FIG. 5). The path of input beam 171 through optical system 110 is shown in FIG. 5. Input beam 171 enters Porro prism 120 at a surface at normal incidence after which it is reflected sequentially by a first surface and then a second surface of Porro prism 120, enters trapezoidal prism 130, is reflected by a bottom surface of trapezoid prism 130, and exits trapezoidal prism 130 at an exit surface as output beam 172. The lengths of the entrance and exit surfaces of trapezoidal prism 130 may be equal or not equal according to requirements of an end use application.

The planes of incidence at the first and second surfaces of Porro prism 120 are parallel and orthogonal to the plane of incidence at the surface of trapezoidal prism 130. The planes of incidence at the surface and at the exit surface of trapezoidal prism 130 are parallel. The directions of propagation of input beam 171 and output beam 172 are generally neither parallel or orthogonal.

There are two polarization preserving eigenmodes of the second embodiment wherein the input polarization states of the two polarization preserving eigenmodes are parallel and orthogonal to the planes of incidence at the first and second surfaces of Porro prism 120. The corresponding output polarization states of the two polarization preserving eigenmodes are orthogonal and parallel to the plane of incidence at the exit surface of trapezoid prism 130, respectively. The eigenmodes are polarization preserving since the polarization states of the eigenmodes are either parallel to or orthogonal to the respective planes of incidence for each reflection and refraction in optical system 110.

The transformation properties of optical system 110 with respect to changes in direction of propagation of output 172 that result from changes in direction of propagation of input beam 171 are the same as the properties of the type $T_{Ret}$ transformation. This will be evident to those skilled in the art upon mapping the effects of changes in the direction of propagation of input beam 171 through optical system 110.

The third embodiment of an optical system in accordance with the present invention exhibits both polarization preserving eigenmodes and the type TRet transformation properties. The third embodiment is shown as a diagrammatic perspective view in FIG. 6 where it is designated generally at 210. Optical system 210 of the third embodiment comprises a Porro prism 220 and an inversion prism 230.

Figure 6:
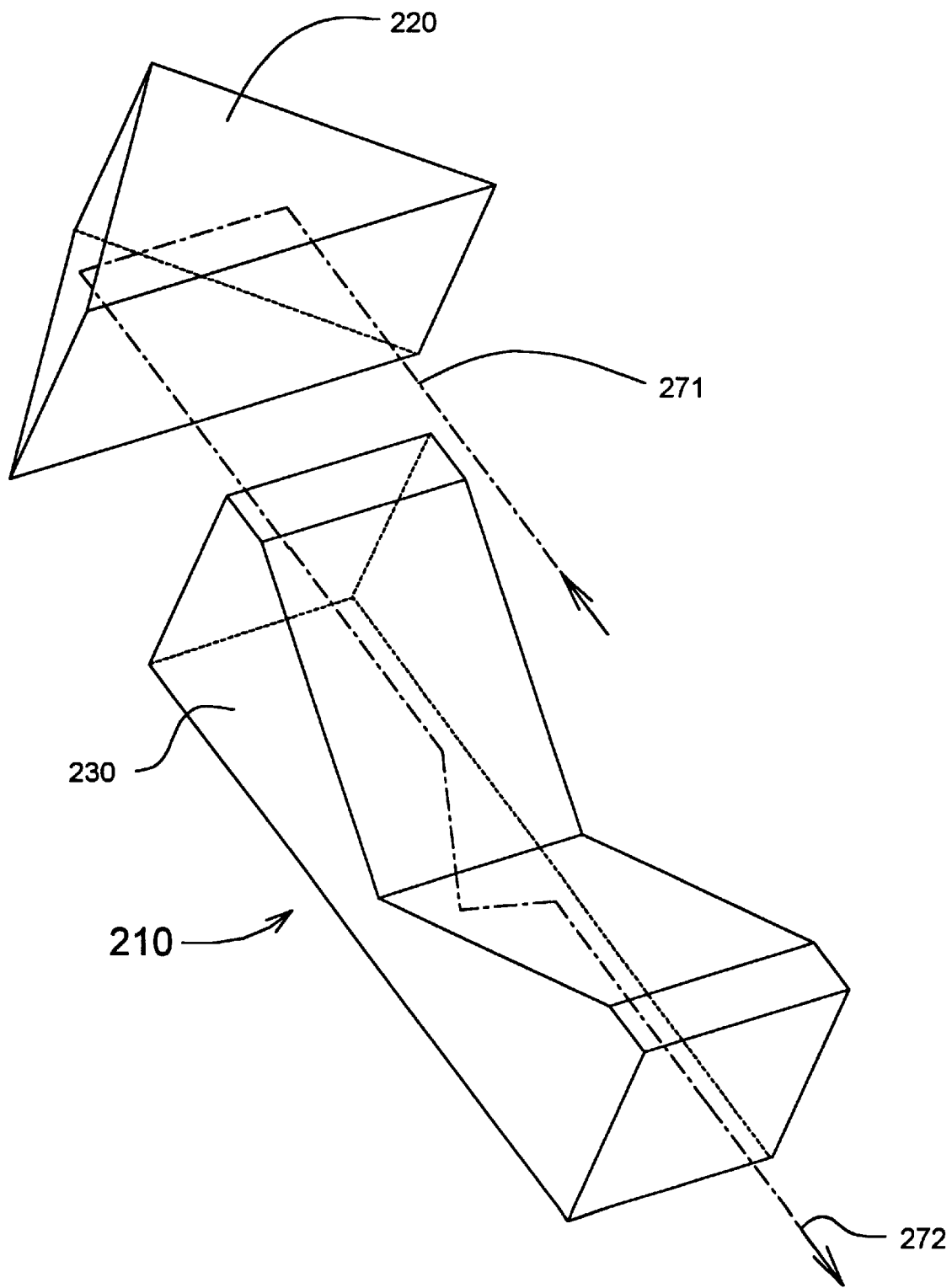
FIG. 6 is a diagrammatic perspective view of a polarization preserving generalized optical system assembly comprising a Porro prism in combination with a "K" type prism along with the relationship between input and output beams as they undergo changes in the direction in which the input beam enters the face of the Porro prism, the input and output beams being offset and parallel to one anther.

An input beam 271 enters optical system 210 and exits optical system 210 as output beam 272 (see FIG. 6). The path of input beam 271 through optical system 210 is shown in FIG. 6. Input beam 271 enters Porro prism 220 at a surface at normal incidence after which it is reflected sequentially by a first surface and then a second surface of Porro prism 220, exits Porro prism 220 at an exit surface and enters inversion prism 230 at an entrance surface, is reflected by a first, second, and third surface of inversion prism 230, and exits inversion prism 230 at an exit surface as output beam 272. The planes of incidence at the first and second surfaces of Porro prism 270 are parallel and orthogonal to the planes of incidence at the first, second, and third surfaces of inversion prism 230. The planes of incidence at the first, second, and third surfaces, the entrance surface, and at the exit surface of the inversion prism are parallel. The directions of propagation of input beam 271 and output beam 272 may be parallel or not parallel according to requirements of an end use application.

There are two polarization preserving eigenmodes of the third embodiment wherein the input polarization states of the two polarization preserving eigenmodes are parallel and orthogonal to the planes of incidence at the first and second surfaces of the Porro prism 220. The corresponding output polarization states of the two polarization preserving eigenmodes are orthogonal and parallel to the plane of incidence of the first, second, and third surfaces of inversion prism 230, respectively. The eigenmodes are polarization preserving since the polarization states of the eigenmodes are either parallel to or orthogonal to the respective planes of incidence for each reflection and refraction in optical system 210.

The transformation properties of optical system 210 with respect to changes in direction of propagation of output 272 that result from changes in direction of propagation of input beam 271 are the same as the properties of the type $T_{Ret}$ transformation. This will be evident to those skilled in the art upon mapping the effects of changes in the direction of propagation of input beam 271 through optical system 210.

The fourth embodiment of an optical system in accordance with the present invention exhibits both polarization preserving eigenmodes and the type TRet transformation properties. The fourth embodiment is shown as a diagrammatic perspective view in FIG. 7 where it is designated generally at 310. Optical system 310 comprises a right angle prism 320, Porro prism 330, and a penta prism 340. Note that a subsystem of optical system 310 comprising right angle prism 320 and Porro prism 330 exhibits both polarization preserving eigenmodes and the type $T_{Ret}$ transformation properties, the subsystem being equivalent to optical system 10 of the first embodiment.

Figure 7:
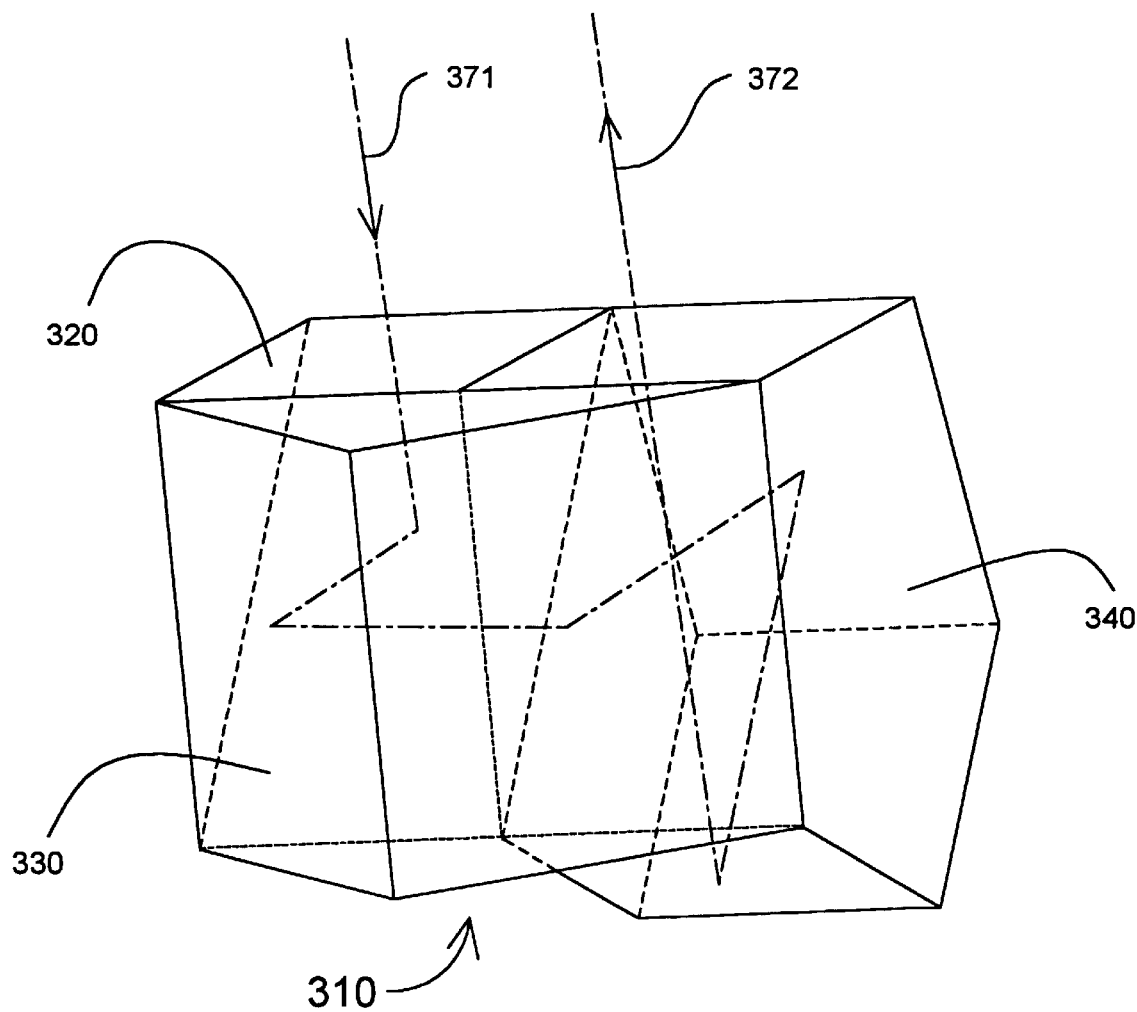
FIG. 7 is a diagrammatic perspective view of a polarization preserving generalized optical system assembly comprising a Porro prism in combination with a right prism and a penta prism along with the relationship between input and output beams and also shows the individual components of the assembly in exploded fashion, the input and output beams being parallel and offset with respect to one another.

An input beam 371 enters optical system 310 and exits optical system 310 as output beam 372 (see FIG. 7). The path of input beam 371 through optical system 310 is shown in FIG. 7. Input beam 371 enters right angle prism 320 at a surface at normal incidence after which it is reflected by a hypotenuse surface of right angle prism 320, exits right angle prism 320 at an exit surface, enters Porro prism 330 at an entrance surface and is reflected sequentially by a first surface and then a second surface of Porro prism 330, and exits Porro prism 330 at an exit surface. After exiting Porro prism 320, beam 371 enters penta prism 340 at an entrance surface after which it is reflected by a first surface and second surface of penta prism 340 and exits penta prism 340 at an exit surface at normal incidence as output beam 372.

The plane of incidence at the hypotenuse surface of the right angle prism 320 is orthogonal to the parallel planes of incidence at the first and second surfaces of Porro prism 330. The planes of incidence at the first and second surfaces of Porro prism 330 are orthogonal to the planes of incidence at the first and second surfaces of penta prism 340. The directions of propagation of input beam 371 and output beam 372 are parallel.

There are two polarization preserving eigenmodes of the fourth embodiment wherein the input polarization states of the two polarization preserving eigenmodes are parallel and orthogonal to the plane of incidence at the hypotenuse surface of right angle prism 370. The corresponding output polarization states of the two polarization preserving eigenmodes are parallel and orthogonal to the planes of incidence of the first and second surfaces of penta prism 340, respectively. The eigenmodes are polarization preserving since the polarization states of the eigenmodes are either parallel to or orthogonal to the respective planes of incidence for each reflection and refraction in optical system 310.

The transformation properties of optical system 310 with respect to changes in direction of propagation of output beam 372 that result from changes in direction of propagation of input beam 371 are the same as the properties of the type $T_{Ret}$ transformation. This will be evident to those skilled in the art upon mapping the effects of changes in the direction of propagation of input beam 371 through optical system 310.

The fifth embodiment of an optical system in accordance with the present invention exhibits both polarization preserving eigenmodes and the type TRet transformation properties. The fifth embodiment is shown as a diagrammatic perspective view in FIG. 8 where it is designated generally at 410. Optical system 410 comprises two beam splitters and a Porro prism 430. The first beam splitter comprises a right angle prism 421 and a trapezoidal prism 422 with a beam-splitting interface 423. The second beam splitter comprises a prism 441 and a right angle prism 442 with a beam-splitting interface 443.

The fifth embodiment comprises a subsystem of optical elements that also exhibits both polarization preserving eigenmodes and the type $T_{Ret}$ transformation properties. The subsystem of optical elements comprises trapezoidal prism 422 with beam splitter interface 423, Porro prism 430, and prism 441 with beam-splitting interface 443.

Figure 8:
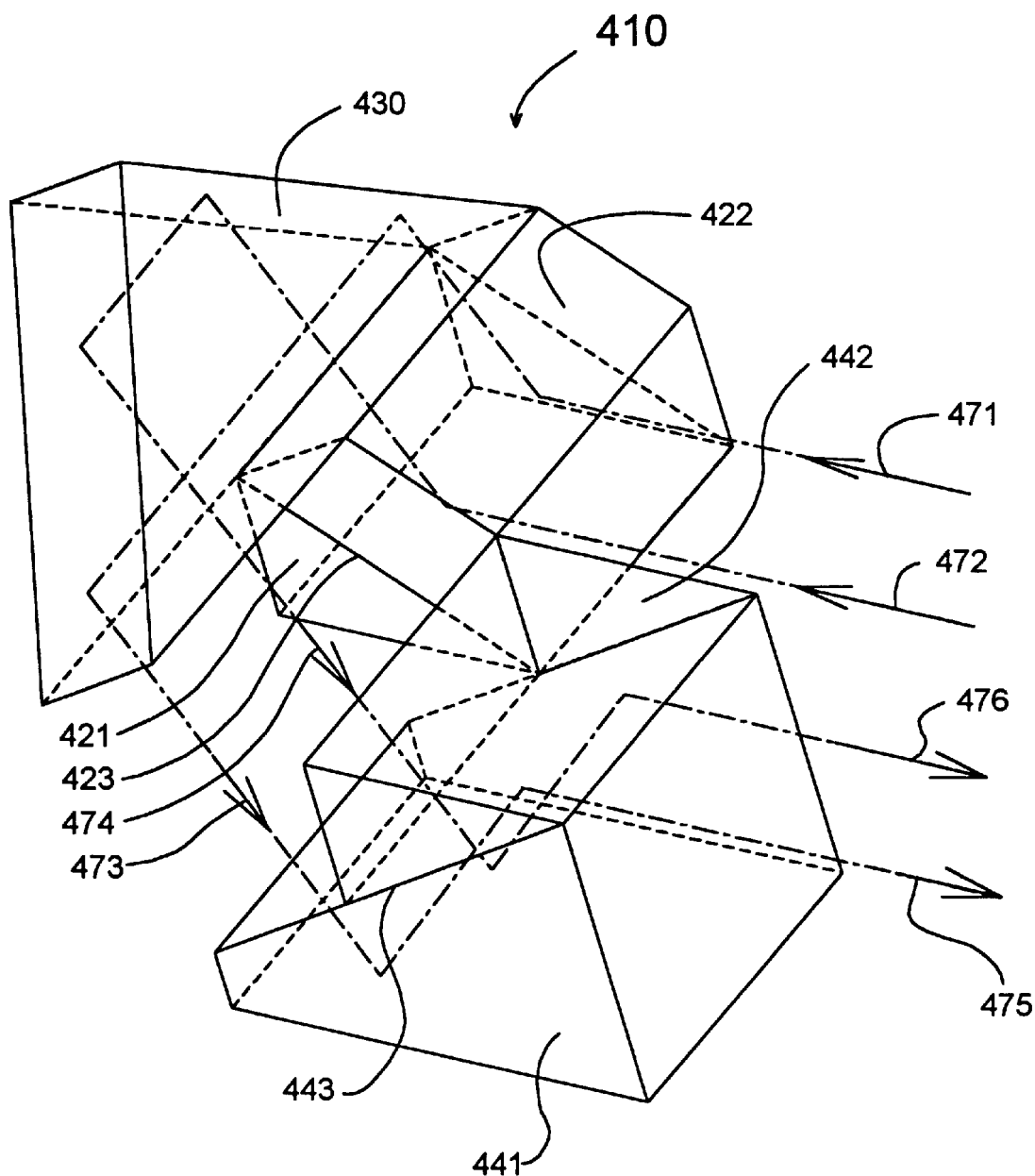
FIG. 8 is a diagrammatic perspective view of a polarization preserving optical system assembly comprising a polarizing beam splitter with a roof prism, and a Porro prism in combination with two angle right prisms along with the relationship between two input and two output beams of the assembly, the input and output beams being offset, parallel, and all lying in a line.

Input beams 471 and 472 enter optical system 410 and exit optical system 410 as output beams 475 and 476, respectively (see FIG. 8). The paths of input beam 471 and 472 through optical system 410 are shown in FIG. 8.

Input beams 471 and 472 enter the first beam splitter with planes of polarization parallel or orthogonal to the respective planes of incidence at beam-splitting interface 423. Input beams 471 and 472 are reflected by beam- splitting interface 423, then exit trapezoidal prism 422 and enter Porro prism 430 at a surface at normal incidence, are reflected sequentially at a first surface and then at second surface of Porro prism 430, and exit Porro prism 430 at a surface at normal incidence as beams 473 and 474, respectively. The planes of incidence of beams 471 and 472 at the first and second surfaces of Porro prism 430 are either orthogonal or parallel to the respective planes of incidence at the beam-splitting interface 423.

Note that the subsystem of optical system 410 comprising trapezoidal prism 422 and Porro prism 430 exhibits both polarization preserving eigenmodes and the type $T_{Ret}$ transformation properties, the subsystem being equivalent to optical system 110 of the second embodiment. Beams 471 and 472 are optical beams that meet the conditions to be classified as being eigenmodes of the subsystem and optical beams of the subsystem for which type $T_{Ret}$ transformations apply.

Beams 473 and 474 next enter prism 441 at a entrance surface at normal incidence, sequentially reflected by a first surface and then by beam-splitting interface 443, and exit prism 441 at an exit surface at normal incidence as output beams 475 and 476, respectively. The planes of polarization of beams 473 and 474 are parallel or orthogonal to the respective planes of incidence at the first surface and beam-splitting surfaces of prism 441.

There are two polarization preserving eigenmodes of the fifth embodiment wherein the input polarization states of the two eigenmodes are parallel and orthogonal to the plane of incidence at the beam splitter interface of trapezoidal prism 422. The corresponding output polarization states of the two polarization preserving eigenmodes are parallel and orthogonal to the planes of incidence of the first and beam-splitting surfaces of prism 441, respectively. The eigenmodes are polarization preserving since the polarization states of the eigenmodes are either parallel to or orthogonal to the respective planes of incidence for each reflection and refraction in optical system 410.

The transformation properties of optical system 410 with respect to changes in direction of propagation of output beams 475 and 476 that result from changes in direction of propagation of input beams 471 and 472, respectively, are the same as the properties of the type $T_{Ret}$ transformation. This will be evident to those skilled in the art upon mapping the effects of changes in the direction of propagation of input beams 471 and 472 through optical system 410.

Having described a number of embodiments of polarization preserving optical systems in accordance with the invention, embodiments in which such optical systems may be incorporated to form interferometers will now be described.

Figure 9:
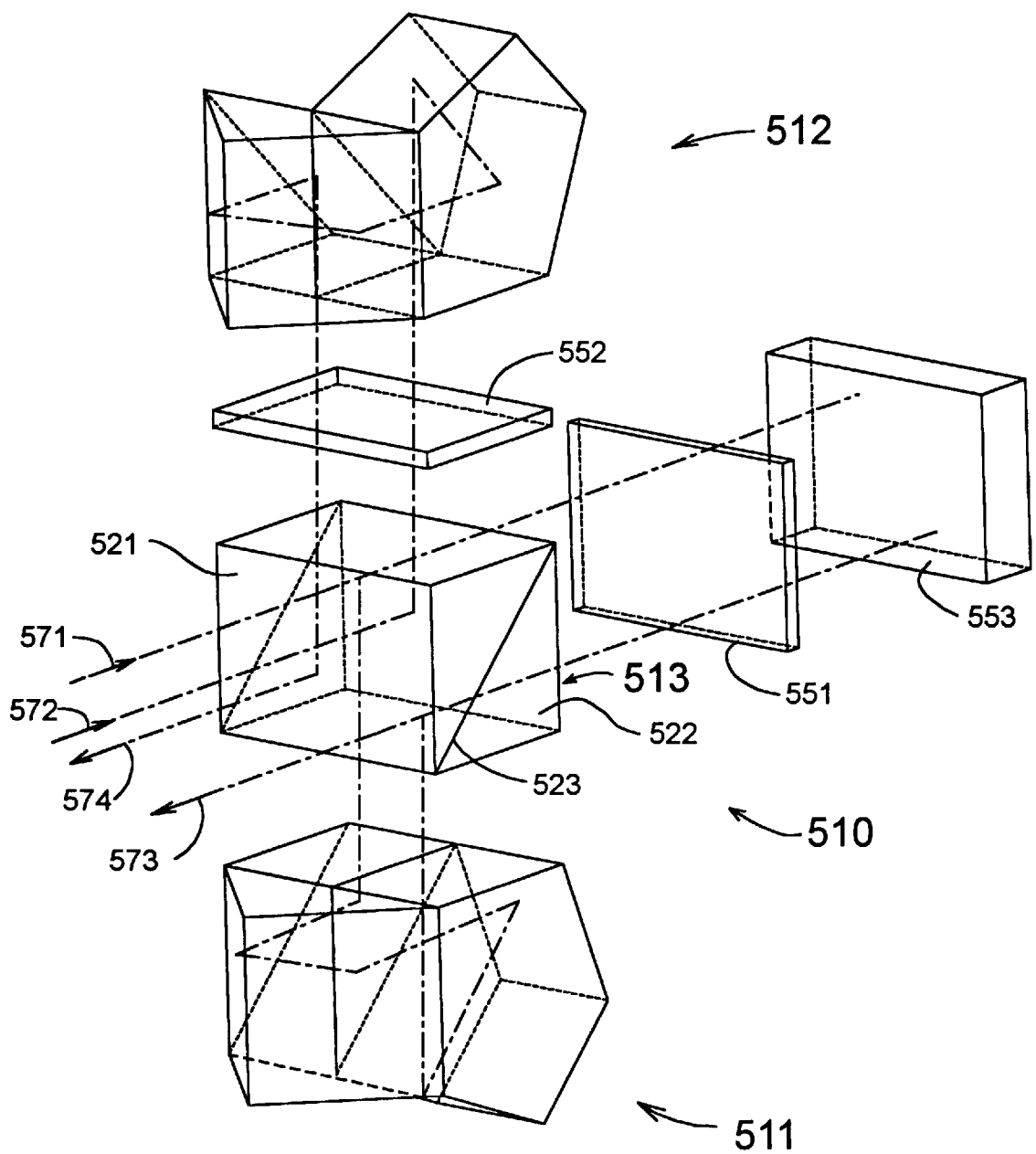
FIG. 9 is a diagrammatic perspective view of a plane mirror interferometer employing two polarization preserving optical system assemblies of the type shown in FIG. 7.

A sixth embodiment in accordance with the present invention is a plane mirror interferometer 510 shown in diagrammatic perspective view in FIG. 9. The plane mirror interferometer 510 comprises a polarizing beam splitter 513, a quarter-wave phase retardation plate 551, object mirror 553, and a first and second polarization preserving optical systems designated generally at 511 and 512, respectively. The components of the polarizing beam splitter 513 are prisms 521 and 522 with a polarizing interface 523. The description of each of the first and second polarization preserving optical systems is the same as the description given for the polarization preserving optical system of the fourth embodiment shown in FIG. 7.

The input beams comprise two orthogonally polarized beams 571 and 572, beam 571 serving as the measurement beam and beam 572 as the reference beam. The polarizing beam splitter 513 reflects the reference beam 572 and transmits the measurement beam 571 at polarizing interface 523. The reference beam returns to the output as beam 574 after being reflected by the second polarization preserving optical system 512 and again by the polarizing beam splitter 513. The measurement beam returns to the output as beam 573 after being reflected twice from object mirror 553, transmission through phase retardation plate 551 twice for each round trip to object mirror 553, being reflected by the first polarization preserving optical system at 511, and being transmitted twice and reflected twice by the polarizing beam splitter 513.

Input beams 571 and 572 and output beams 573 and 574 are shown in FIG. 9 as being spatially separated. It will be evident to those skilled in the art that input beams 571 and 572 can alternatively be arranged to be coextensive as well as the output beams 573 and 574 without departing from the scope and the spirit of the invention.

Figure 10:
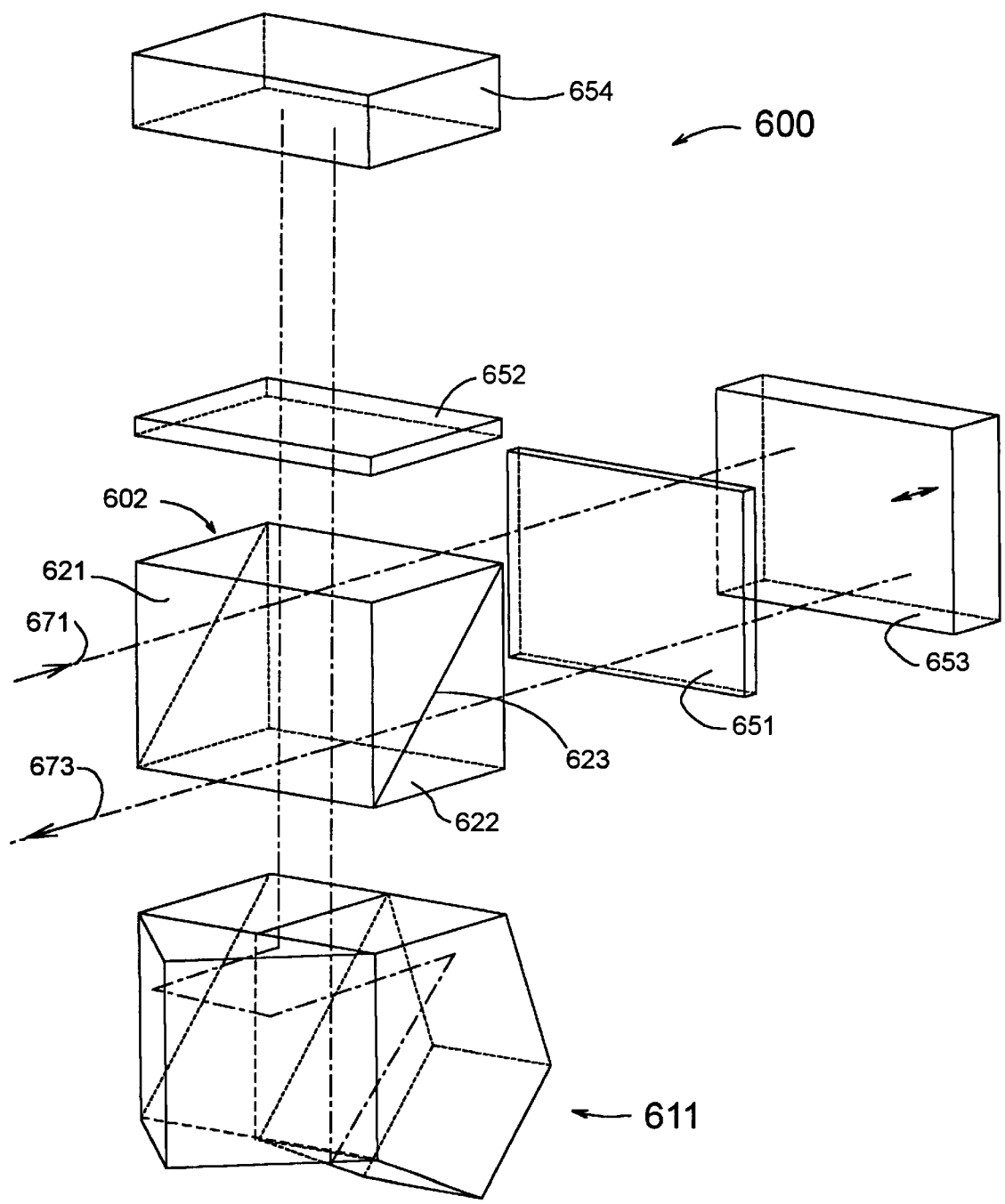
FIG. 10 is a diagrammatic perspective view of a high stability plane mirror interferometer employing a single polarization preserving optical system assembly of the type shown in FIG. 7.

The seventh embodiment in accordance with the present invention is a high stability plane mirror interferometer 600 shown in diagrammatic perspective view in FIG. 10. The high stability plane mirror interferometer 600 comprises a polarizing beam splitter 602, quarter-wave phase retardation plates 651 and 652, object mirror 653, reference mirror 654, and a polarization preserving optical system designated generally at 611. The components of the polarizing beam splitter 602 are prisms 621 and 622 with a polarizing interface 623. The description of the polarization preserving optical system is the same as the description given for the polarization preserving optical system of the fourth embodiment shown in FIG. 7.

An input beam 671 comprises two orthogonally polarized beam components. The polarizing beam splitter 602 reflects one component of input beam 671 as a reference beam and transmits the second component of input beam 671 as a measurement beam at polarizing interface 623. The reference beam returns as a reference beam component of output beam 673 after being reflected twice by the reference mirror 654, transmission through phase retardation plate 652 twice for each round trip to reference mirror 654, being reflected by the polarization preserving optical system at 611, and being reflected twice and transmitted twice by the polarizing beam splitter 602. The measurement beam returns as a measurement beam component of output beam 673 after being reflected twice from object mirror 653, transmission through phase retardation plate 651 twice for each round trip to object mirror 653, being reflected by the polarization preserving optical system at 611, and being transmitted twice and reflected twice by the polarizing beam splitter 602.

The reference and measurement beam components of input beam 671 and the reference and measurement beam components of output beam 673 are shown in FIG. 10 as being coextensive, respectively. It will be evident to those skilled in the art that the reference and measurement beam components of input beam 671 can alternatively be arranged to be spatially separated as well as the reference and measurement beam components of output beam 673 without departing from the scope and the spirit of the invention.

Figure 10A:
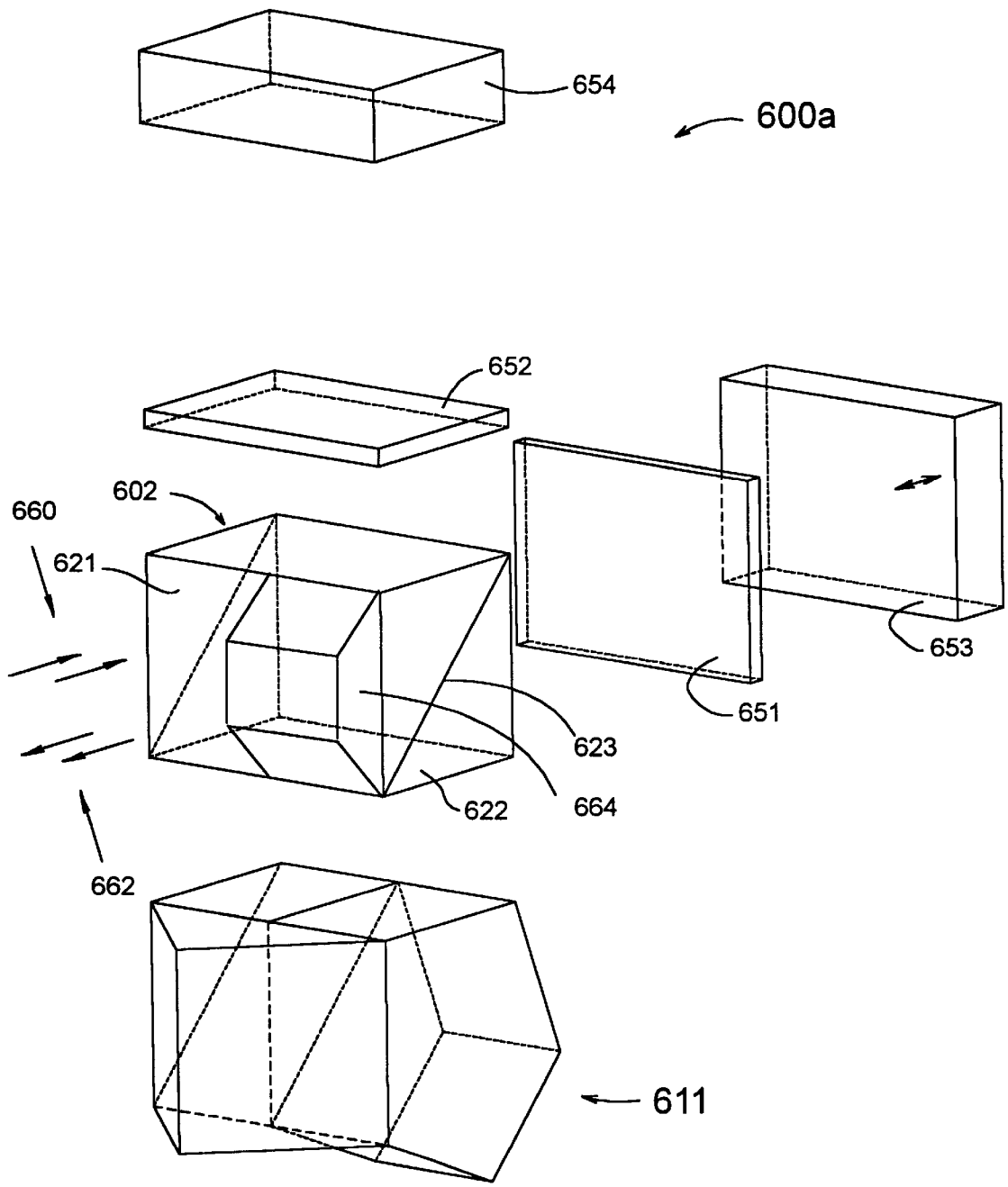
FIG. 10a is a diagrammatic perspective view of a high stability plane mirror interferometer employing a single polarization preserving optical system assembly of the type shown in FIG. 7 along with a prismatic optical element for providing a four-pass arrangement to enhance sensitivity.

Reference is now made to FIG. 10a that shows a variant of the interferometer 600 of FIG. 10 and is designated generally as 600a. Interferometer 600a differs in operation from interferometer 600 by virtue of the fact that it provides for four passes of its reference and object beams to enhance sensitivity, the reference and object beams are spatially separated to reduce polarization mixing, and the input and output beam locations are vertically separated on the same side of the input facet of the polarization beam splitter 602. Otherwise, both interferometers have elements in common, and those elements carry the same numerical designation in FIG. 10a as they have in FIG. 10. As seen in FIG. 10a, there are two spatially separated input beams 660 that are orthogonally polarized with respect to one another. Input beams 660 travel through interferometer 600a in a fashion similar to the corresponding beams in FIG. 10 except that in FIG. 10, the orthogonally polarized beams are overlapped. In addition, at what was the output in FIG. 10, the corresponding beams in interferometer 600a are intercepted by prismatic element 664 that operates to reintroduce them into the polarizing beam splitter 602 after which they undergo two additional passes through interferometer 600a to emerge as output beams 662. Input beams 660 may be provided from a single laser whose output can be split or can originate from separate lasers, and output beams 662 may be combined for subsequent signal processing (See FIG. 16a for examples of splitting and combining optics). It will also be evident that input beams of different wavelengths may be provided as pairs of spatially separated beams which wavelengths may be harmonically related and be provided by frequency doubling techniques or, alternatively, the input beams may be spatially separated with each having components of different wavelength but with the same polarization.

Figure 11:
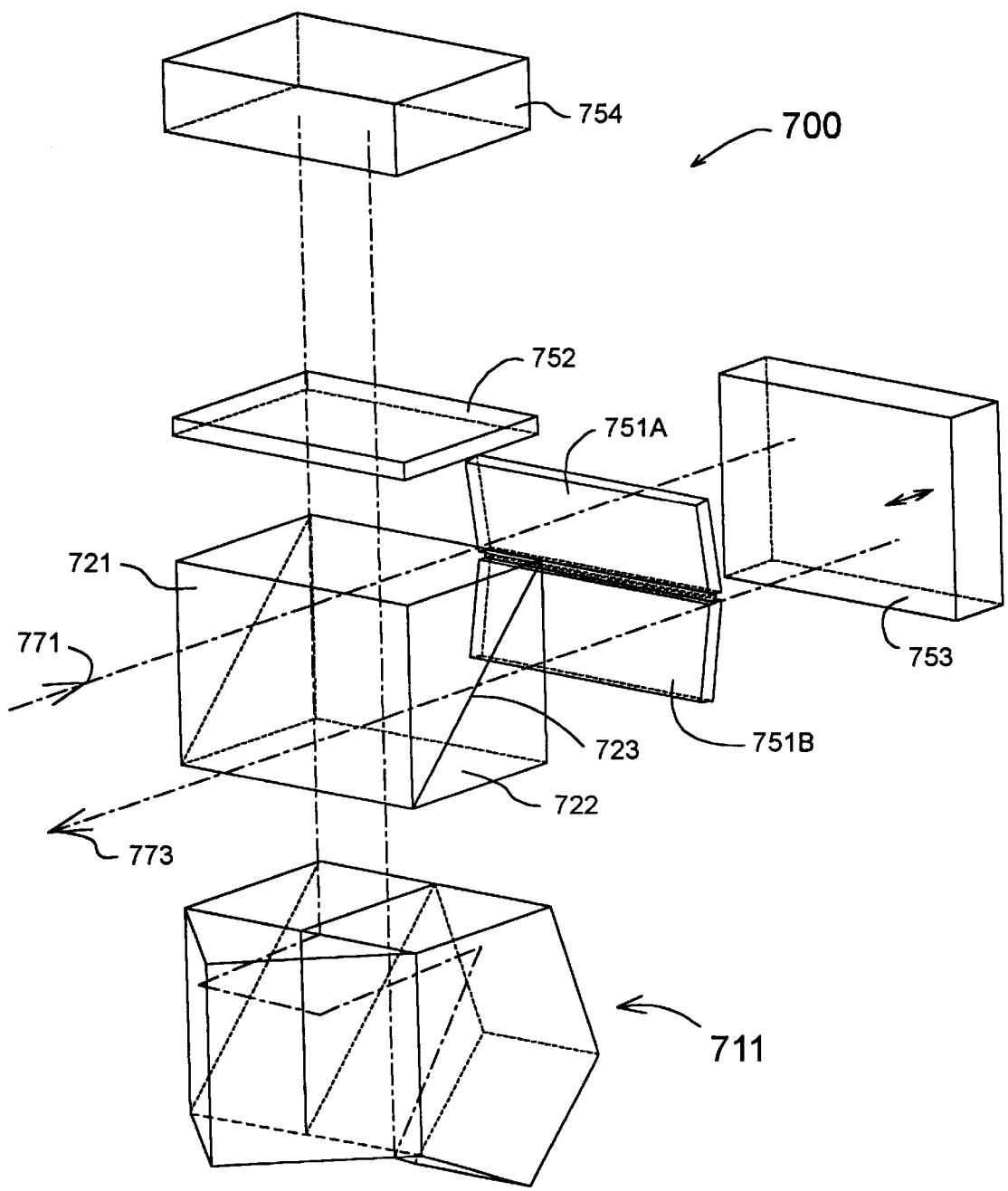
FIG. 11 is a diagrammatic perspective view of a high stability plane mirror interferometer employing a single polarization preserving optical system assembly of the type shown in FIG. 7 along with a split quarter-wave plate in the intervening space between its polarizing beam splitter and the object mirror, the plates of the split quarter-wave plate being tilted relative to each other to prevent unwanted polarizing mixing.

The eighth embodiment in accordance with the present invention is a high stability plane mirror interferometer 700 shown in diagrammatic perspective view in FIG. 11. The eighth embodiment exhibits reduced cyclic errors and comprises a plane mirror interferometer with a split quarter-wave phase retardation plate in a measurement leg. Many elements of the eighth embodiment form like functions as elements of the seventh embodiment shown in the FIG. 10, the element number of an eighth-embodiment element being 100 larger than the element number of a corresponding seventh-embodiment element. The function of phase retardation plate 651 of the seventh embodiment is achieved in the eighth embodiment by two phase retardation plates 751A and 751B.

Phase retardation plates 751A and 751B are tilted one with respect to the other so as to eliminate a potential source of cyclic errors. The potential source of cyclic errors is a generation of a spurious beam by two ghost reflections from a phase retardation plate such as phase retardation plate 651 found in the seventh embodiment. The description of the reduction of the cyclic errors in =the eighth embodiment is the same as corresponding description given in copending commonly owned U.S. patent application Ser. No. 09/384, 609 entitled "INTERFEROMETER HAVING REDUCED GHOST BEAM EFFECTS" by Peter de Groot the contents of which are incorporated herein by reference. The function of the phase retardation plates may be strategically achieved by other surfaces of an interferometer as, for example, by tilting selected surfaces of a polarizing beam splitter.

The remaining description of the eighth embodiment is the same as the corresponding portion of the description given for the seventh embodiment.

Figure 12:
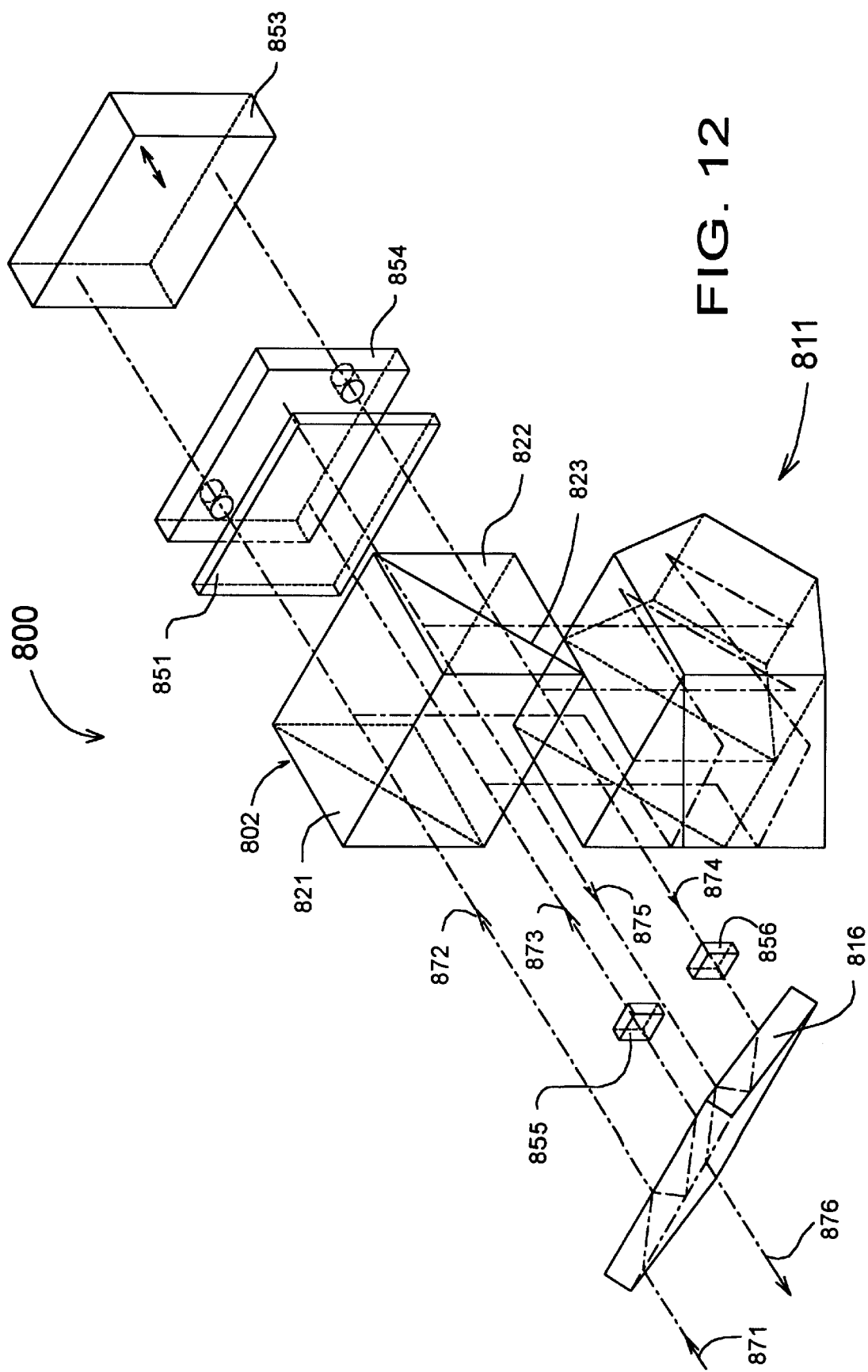
FIG. 12 is a diagrammatic perspective view of a differential plane mirror interferometer employing a single polarization preserving optical system assembly of the type shown in FIG. 7 along with a shear plate with polarizing beam splitter surfaces to spatially separate and combine input and output beams.
Figure 13:
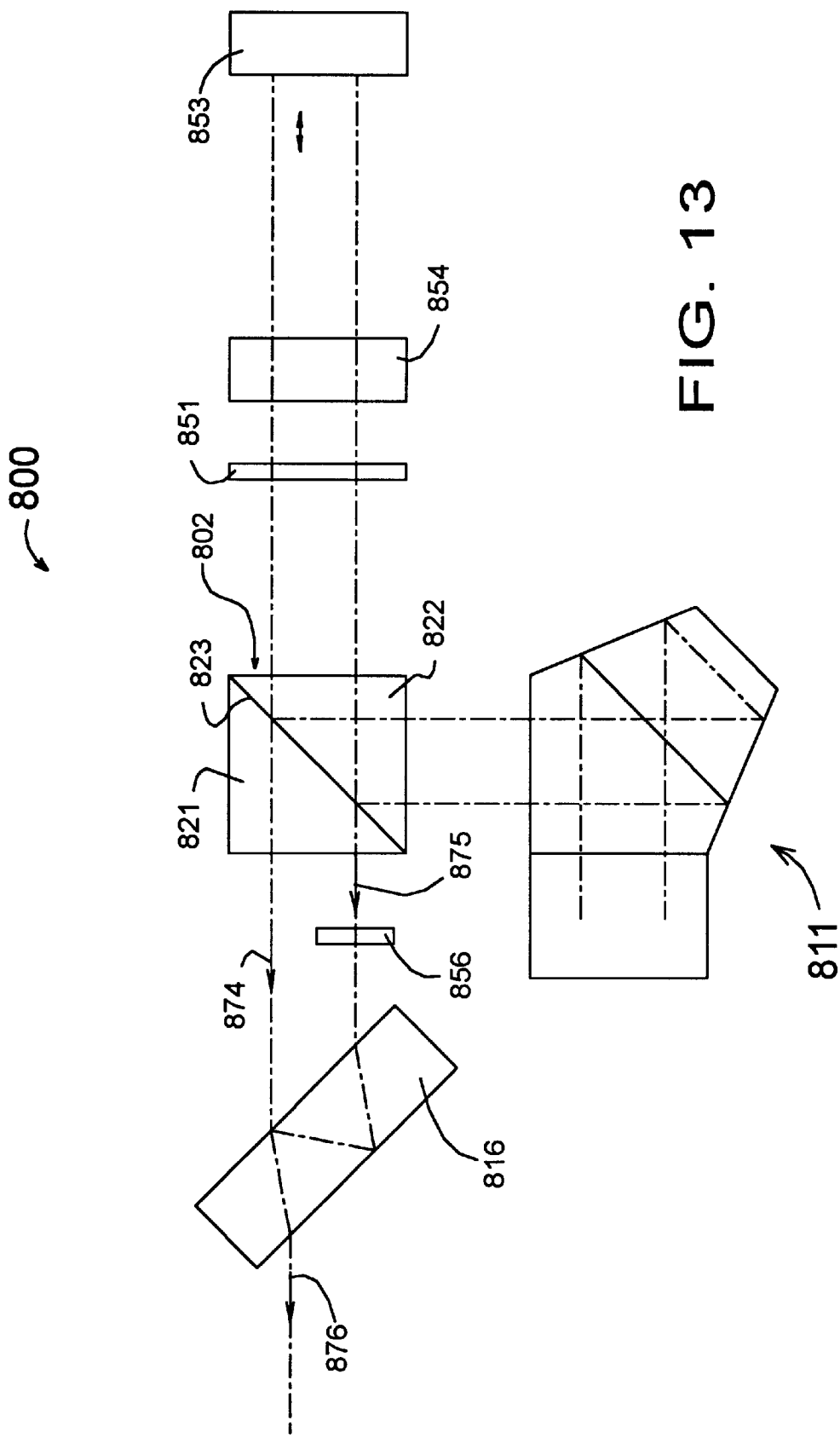
FIG. 13 is a diagrammatic elevational view of the assembly of FIG. 12 illustrating various paths of travel of beams as they propagate through the assembly.

The ninth embodiment in accordance with the present invention is a differential plane mirror interferometer 800 shown in diagrammatic perspective view in FIG. 12 and in a diagrammatic side view in FIG. 13. The differential plane mirror interferometer 800 comprises a shear plate 816, a polarizing beam splitter 802, quarter-wave phase retardation plate 851, object mirror 853, reference mirror 854, and a polarization preserving optical system designated generally at 811. The components of the polarizing beam splitter 802 are prisms 821 and 822 with a polarizing interface 823. The description of the polarization preserving optical system is the same as the description given for the polarization preserving optical system of the fourth embodiment shown in FIG. 7.

An input beam 871 comprises two orthogonally polarized beam components. Shear plate 816 transmits one polarization component of input beam 871 as a measurement beam 872. The second polarization component of input beam 871 is first transmitted by shear plate 816, after two internal reflections, and then transmitted by a half-wave phase retardation plate 855 as a reference beam 873. Half-wave phase retardation plate 855 is orientated so as to rotate the plane of polarization of reference beam 873 to be parallel to the plane of polarization of measurement beam 872 and parallel to the plane of FIG. 13. Measurement beam 872 and reference beam 873 are spatially separated.

Measurement beam 872 returns as a measurement beam 874 after being reflected twice by object mirror 853, transmission through phase retardation plate 851 twice for each round trip to object mirror 853, being reflected by the polarization preserving optical system 811, and being reflected twice and transmitted twice by the polarizing beam splitter 802. Reference mirror 854 comprises two apertures (see FIG. 12) through which the measurement beam passes in transit to and from object mirror 853.

Reference beam 873 returns as a reference beam 875 after being reflected twice from reference mirror 854, transmission through phase retardation plate 851 twice for each round trip to reference mirror 854, being reflected by the polarization preserving optical system 811, and being reflected twice and transmitted twice by the beam splitter 802.

Next, measurement beam 874 is transmitted by half-wave phase retardation plate 856 and then transmitted by shear plate 816, after two internal reflections, as a measurement beam component of output beam 876. Half-wave phase retardation plate 856 is orientated so as to rotate the plane of polarization of the measurement beam component of output beam 876 by 90° with respect to the plane of polarization of measurement beam 874. Reference beam 875 is transmitted by shear plate 816 as a reference beam component of output beam 876. The measurement and reference beam components of output beam 876 are orthogonally polarized.

The remaining description of the ninth embodiment is the same as corresponding portions of the description given for the seventh embodiment.

Figure 14:
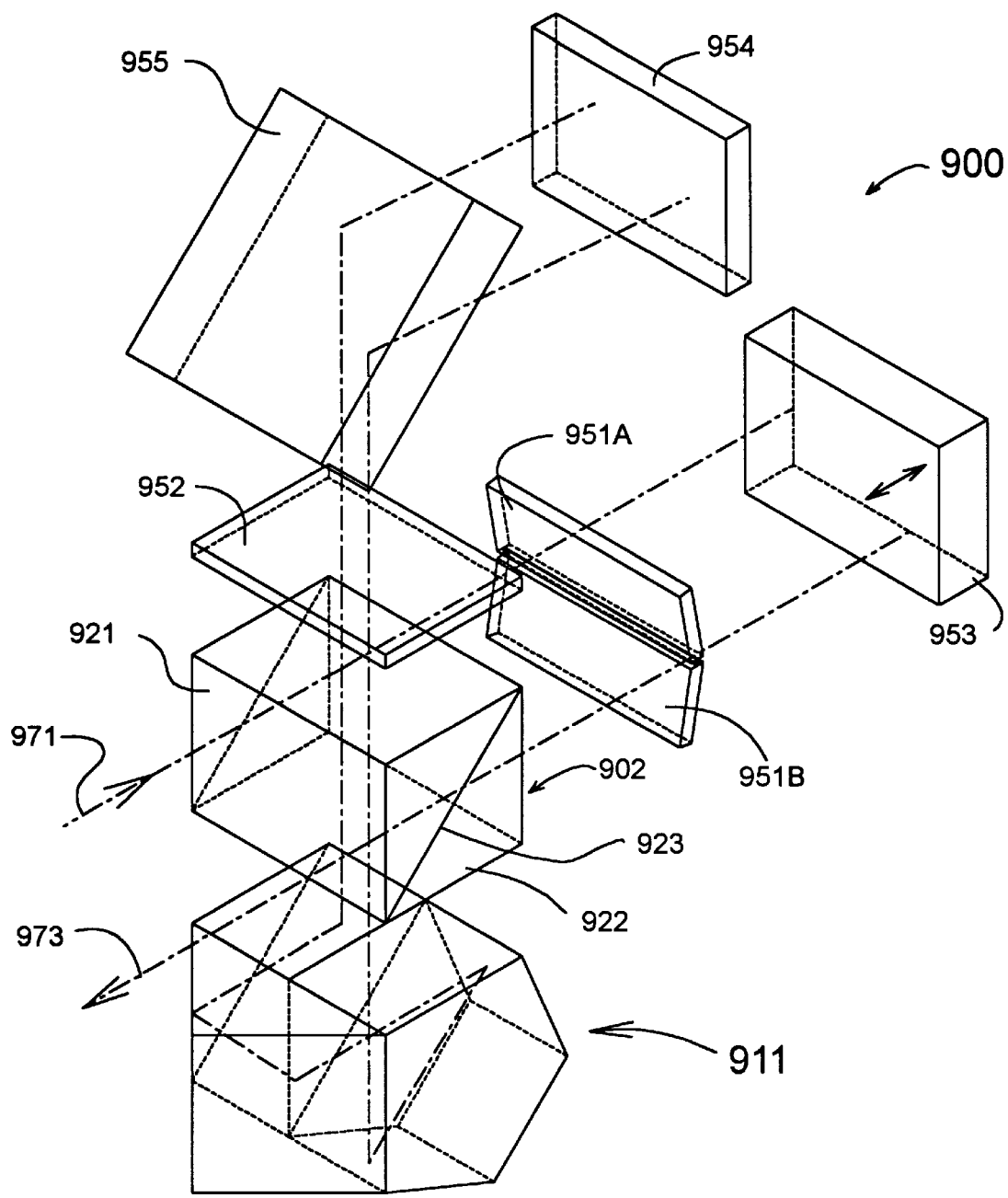
FIG. 14 is a diagrammatic perspective view of a high stability plane mirror column type interferometer employing a single polarization preserving optical system assembly of the type shown in FIG. 7 along with a split quarter-wave plate in the intervening space between its polarizing beam splitter and the object mirror, the plates of the split quarter-wave plate being tilted relative to each other to prevent unwanted polarizing mixing.

The tenth embodiment in accordance with the present invention is a high stability plane mirror interferometer 902 shown in diagrammatic perspective view in FIG. 14. The high stability plane mirror interferometer 900 of the tenth embodiment is configured for use in applications requiring a column reference.

Many elements of the tenth embodiment form like functions as elements of the seventh embodiment shown in the FIG. 10, the element number of an tenth-embodiment element being 200 larger than the element number of a corresponding eighth-embodiment element. Mirror 955 reflects the reference beam in transit between reference mirror 954 and a polarizing beam splitter 902. Reference mirror 954 is attached to a reference object such as a column containing an imaging system for focusing radiation onto a wafer and the measurement mirror 953 is attached to a wafer stage as a measurement object supporting the wafer wherein the imaging system, radiation, wafer, and wafer stage are components of a lithography tool used in the manufacture of integrated circuits, such lithography apparatus to be described further hereinafter.

The remaining description of the tenth embodiment is the same as corresponding portion of the description given for the eighth embodiment.

An eleventh embodiment in accordance with the present invention is a dual linear/angular displacement interferometer system 1000 shown in diagrammatic view in FIG. 15. Certain subsystems of the dual linear/angular displacement interferometer system 1000 exhibit both polarization preserving eigenmodes and the type $T_{Ret}$ transformation properties. A dual linear/angular displacement interferometer shown as element 1010 in FIG. 15 comprises two interferometers wherein the outputs of the two interferometers are combined to yield a linear displacement and an angular displacement of an object mirror. Dual linear/angular displacement interferometer 1010 further comprises a high stability plane mirror interferometer for each of the two interferometers and the two interferometers have a common polarizing beam splitter 1002, a common object mirror 1053, a common reference mirror 1054, common quarter-wave phase retardation plates 1051 and 1052, and a common source 1014. The polarizing beam splitter 1002 comprises prisms 1021 and 1022 with a polarizing interface 1023.

The high stability plane mirror interferometers are each of the polarization preserving type of the seventh embodiment shown in FIG. 10. The high stability plane mirror interferometers comprise polarization preserving optical systems generally shown at 1011 and 1012. The polarization preserving optical systems are the same as the one shown in FIG. 7 of fourth embodiment.

Common source 1014 generates beam 1071. Source 1014 is preferably a source such as a single frequency laser and acousto-optical modulator arranged to generate beam 1071 with two orthogonally polarized components having different optical frequencies. The two orthogonal planes of polarization are orientated at angles of 45° to the plane of FIG. 15. Beam 1071 is incident on non-polarizing beam splitter 1016A and a first portion thereof is transmitted as a first input beam for one of the two high stability plane mirror interferometers. A second portion of beam 1071 incident on beam splitter 1016A is reflected by beam splitter 1016A and then reflected by mirror 1016B as a second input beam 1072 for the second of the two high stability plane mirror interferometers.

The propagation of the first input beam and the second input beam 1072 through the dual linear/angular displacement interferometer 1010 is shown in FIG. 15 and exit interferometer 1010 as output beams 1073 and 1074, respectively. Output beams 1073 and 1074 each have orthogonally polarized measurement and reference beam components. Output beam 1073 is transmitted by polarizer 1055 as a mixed beam that is detected by detector 1061 preferably by the photoelectric effect to produce a first electrical interference signal or a first heterodyne signal. Output beam 1074 is transmitted by polarizer 1056 as a mixed beam that is detected by detector 1062 preferably by the photoelectric effect to produce a second electrical interference signal or a second heterodyne signal. The first and second heterodyne signals are transmitted to electronic processor and computer 1065 to generate a corresponding first and second relative linear displacements. The first and second relative linear displacements are averaged to produce a relative linear displacement 1075 of object mirror 1053 and subtracted one from the other wherein the resulting difference is used to produce a relative angular displacement 1076 of object mirror 1053.

The remaining description of the eleventh embodiment is the same as corresponding portions of the description given for the seventh embodiment.

A variant of the eleventh embodiment in accordance with the present invention comprises a dual linear/angular displacement interferometer system. The variant of eleventh embodiment exhibits reduced sources of certain cyclic errors and certain subsystems of the dual linear/angular displacement interferometer system exhibit both polarization preserving eigenmodes and the type $T_{Ret}$ transformation properties. The variant of the eleventh embodiment comprises two high stability plane mirror wherein each of the high stability plane mirror interferometers is of the high stability plane mirror interferometer type shown in FIG. 11 of the eighth embodiment.

The remaining description of the variant of the eleventh embodiment is the same as corresponding portions of the descriptions given for the eighth and eleventh embodiments.

It will be evident to one skilled in the art that the eleventh embodiment and its variant may be readily extended to simultaneously measure multiple degrees of freedom in displacement and angle and that such measurements may be made along orthogonal or other directions if desired. This may be done, for example, through the use of a plurality of devices in the form of the eleventh embodiment and/or through additional interferometer sections added to the eleventh embodiment or both.

Other examples of optical systems exhibiting polarization preserving eigenmodes and the type $T_{Ret}$ transformation properties are optical systems of a twelfth embodiment in accordance with the present invention. The twelfth embodiment comprises a differential plane mirror interferometer 1100 with a dynamic element 1155 as shown in diagrammatic perspective view in FIG. 16a. The orientation of dynamic element 1155 is servoed to maintain the measurement beam perpendicular to an object mirror 1153.

Input beam 1171 comprises two orthogonally polarized components having frequencies different one for the other. Input beam 1171 enters a first beam splitter comprising a right angle prism 1141 and a rhomboidal prism 1142 with a polarizing interface 1143. A first portion of input beam 1171 incident on polarizing interface 1143 is transmitted as a measurement beam 1173. A second portion of input beam 1171 incident on polarizing interface 1143 is reflected and exits the first beam splitter, after an internal reflection, as a reference beam 1174.

Figure 16A:
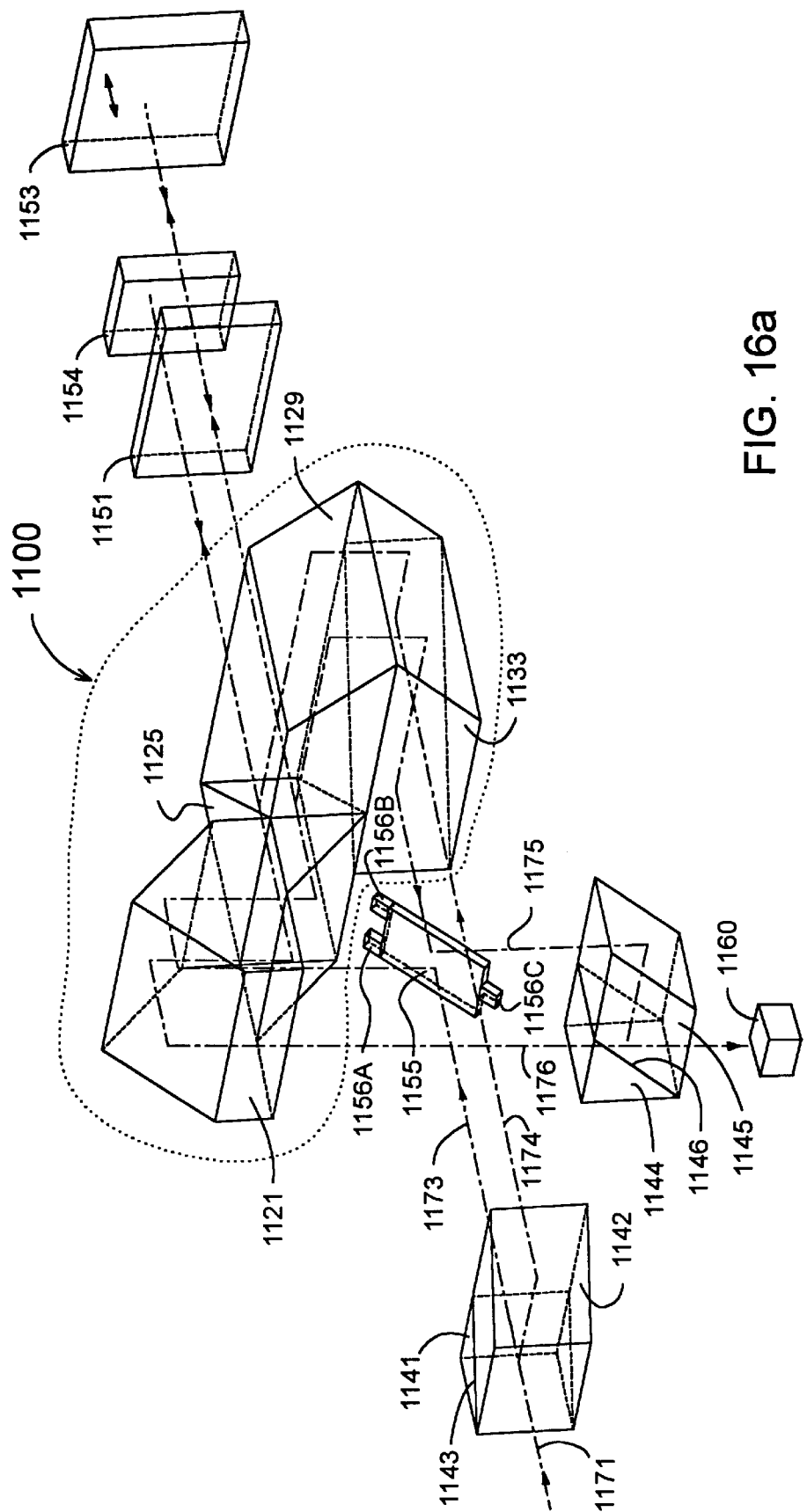
FIG. 16a is a diagrammatic perspective of a differential plane mirror interferometer employing polarization preserving optical systems along with a dynamic element for assuring that a measurement beam thereof remains aligned perpendicular to its plane object mirror.
Figure 16B:
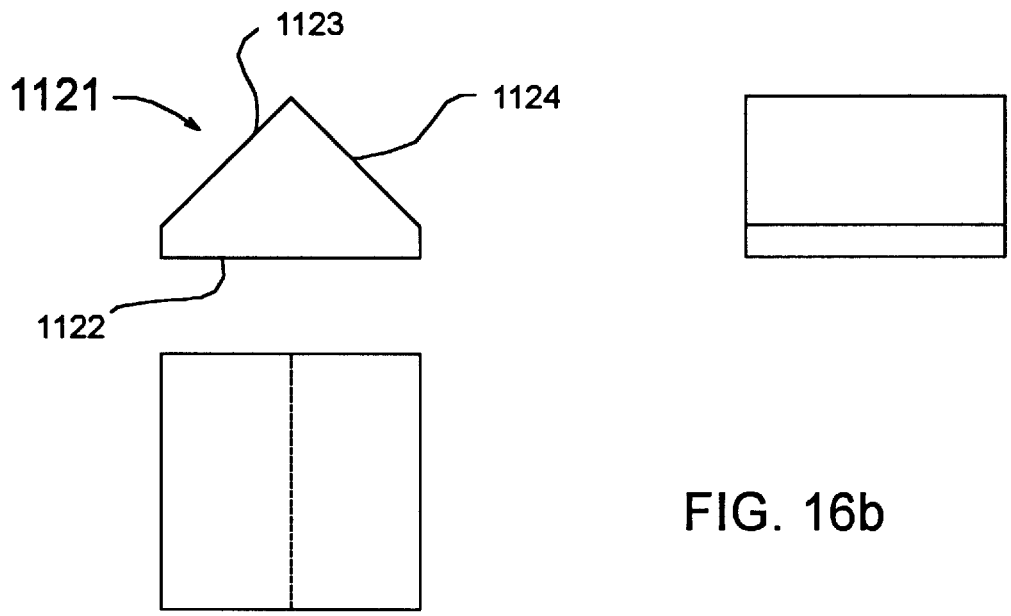
Figure 16C:
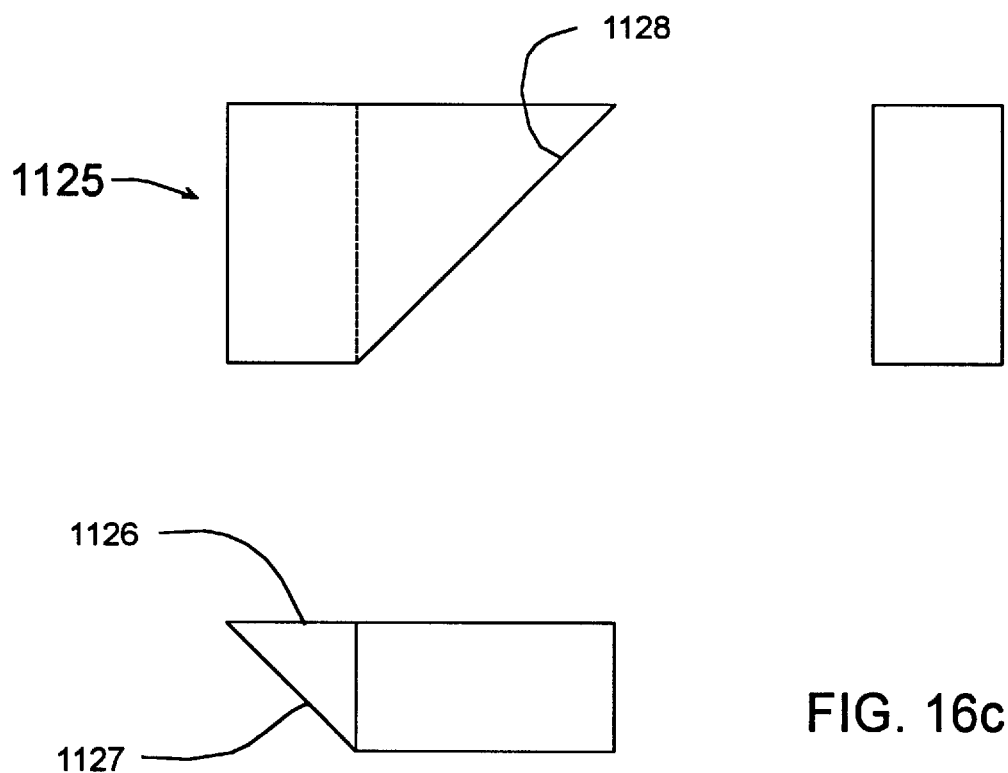
Figure 16D:
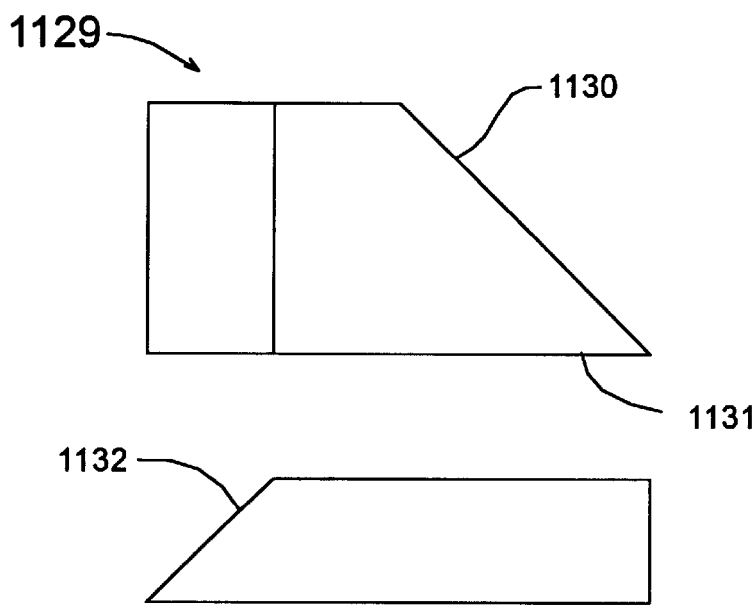
Figure 16E:
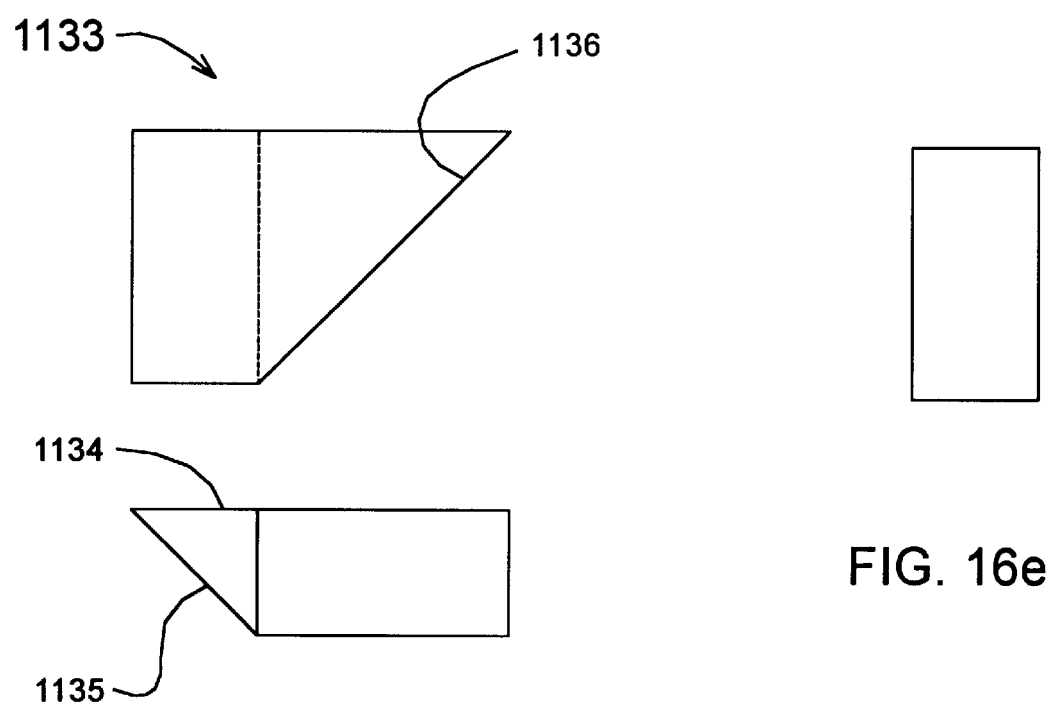

Measurement beam 1173 and reference beam 1174 exit the differential plane mirror 1100 interferometer as output measurement and reference beams 1175 and 1176, respectively. Propagation of measurement beam 1173 and reference beam 1174 through the differential plane mirror interferometer 1100 is shown in FIG. 16a. The orientation of dynamic mirror 1155 is controlled by transducers 1156A, 1156B, and 1156C. Output measurement and reference beams 1175 and 1176 are combined into a mixed output beam by a second beam splitter comprising right angle prism 1144, rhomboidal prism 1145, and beam splitting interface 1146. The output beam is received by detector and signal processor 1160 that operates to provide information, e.g., such as phase detection and phase analysis, about linear and/or angular displacements of object mirror 1153 and information relating to the alignment of beams, e.g., such as detection of changes in direction of propagation of the measurement beam component of the output beam, used for the servo control of dynamic mirror 1155. Along with other interferometers having dynamic elements, operation of the differential plane mirror interferometer 1100 is further described in copending, commonly owned U.S. patent application 09/384,851filed Aug. 27, 1999entitled "Interferometry System Having A Dynamic Beam Steering Assembly For Measuring Angle and Distance" by Henry A. Hill, which copending application is incorporated herein by reference.

An optical subsystem indicated as 1100 in FIG. 16a, quarter-wave phase retardation plate 1151, and reference mirror 1154 exhibit, as a first optical system, polarization preserving eigenmodes and the type $T_{Ret}$ transformation properties for input reference beam 1174. Also optical subsystem 1100, quarter-wave phase retardation plate 1151, object mirror 1153, and dynamic element 1155 for a fixed orientation exhibit, as a second optical system, polarization preserving eigenmodes and the type $T_{Ret}$ transformation properties for input measurement beam 1174

Optical subsystem 1100 comprises a modified Porro prism 1121 and prisms 1125, 1129, and 1133 shown schematically in FIGS. 16b, 16c, 16d, and 16e, respectively. An interface comprising surfaces 1128 and 1130 is a polarizing beam splitter interface.

There are two polarization preserving eigenmodes of the first optical system wherein the input polarization states of the two eigenmodes are orthogonal and parallel, respectively, to the plane of incidence at surface 1136 of prism 1133. The corresponding output polarization states of the two polarization preserving eigenmodes are orthogonal and parallel to the plane of incidence at surface 1123 of prism 1121. The eigenmodes are polarization preserving since the polarization states of the eigenmodes are either parallel to or orthogonal to the respective planes of incidence for each reflection and refraction in the first optical system.

There are also two polarization preserving eigenmodes of the second optical system wherein the input polarization states of the two eigenmodes are orthogonal and parallel, respectively, to the plane of incidence at a first surface of dynamic element 1155. The plane of incidence at the first surface of dynamic element 1155 is parallel to the plane of incidence of beams of the eigenmodes at surface 1123 of Porro prism 1121. The corresponding output polarization states of the two polarization preserving eigenmodes are parallel and orthogonal, respectively, to the planes of incidence of a surface of dynamic element 1155. The eigenmodes are polarization preserving since the polarization states of the eigenmodes are either parallel to or orthogonal to the respective planes of incidence for each reflection and refraction in the second optical system.

The transformation properties of the first and second optical systems of the twelfth embodiment with respect to changes in direction of propagation of output beams 1175 and 1176 that result from changes in direction of propagation of input beams 1173 and 1174, respectively, are the same as the properties of the type $T_{Ret}$ transformation. This will be evident to those skilled in the art upon mapping the effects of changes in the direction of propagation of input beams 1173 and 1174 through the first and second optical systems.

A thirteenth embodiment in accordance with the present invention exhibits enhanced polarizing beam splitter properties, polarization preserving eigenmodes, and the type $T_{Ret}$ transformation properties. The use of an optical system in an interferometer exhibiting enhanced polarizing beam splitter properties can for example lead to reduced cyclic errors in phase differences measured with the interferometer.

Figure 17:
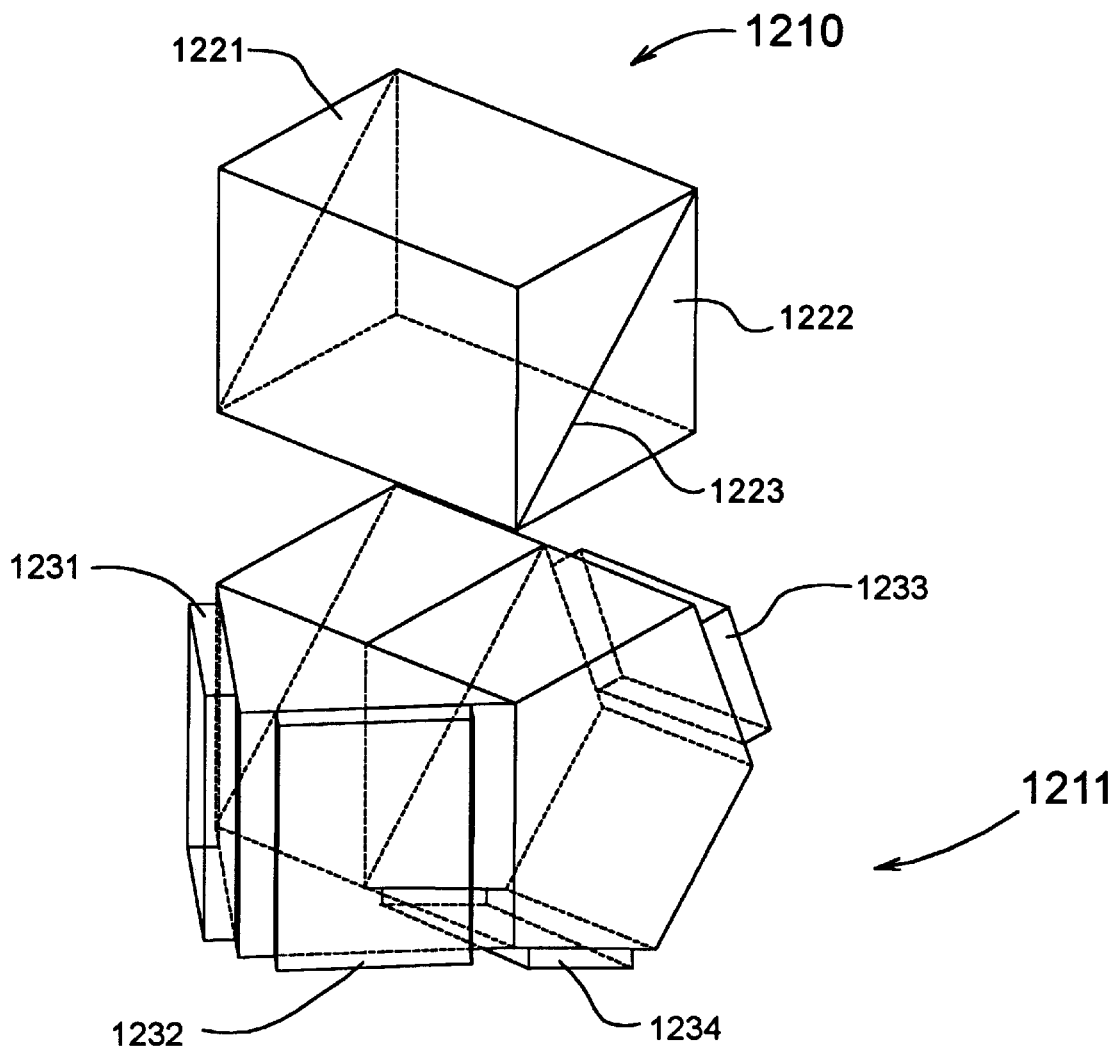
FIG. 17 is a diagrammatic perspective of a polarization preserving optical system assemblies shown in combination with a polarizing beam splitter, one of the prismatic elements of the optical system assemblies having reflecting surfaces with multilayer beam splitter arrangements formed thereon to enhance the extinction ratio of the combination.

The thirteenth embodiment is shown as a diagrammatic perspective view in FIG. 17 and comprises a beam splitter and a polarization preserving optical system shown generally at 1211. The beam splitter comprises prisms 1221 and 1222 with a polarizing beam splitting interface 1223. The polarization preserving optical system comprises the polarization preserving optical system shown in FIG. 7 of the fourth embodiment with polarizing properties for certain reflecting surfaces. The certain reflecting surfaces can comprise one or more of those surfaces of the right angle prism, the Porro prism, and the penta prism of the polarization preserving optical system at which beams corresponding to eigenmodes (of the polarization preserving optical system) are internally reflected. For the thirteenth embodiment, the certain reflecting surfaces comprise the internally reflecting surfaces of the Porro prism and the penta prism of the polarization preserving optical system.

Optical flats 1231, 1232, 1233, and 1234 are either cemented onto the internally reflecting surfaces of the Porro prism and the penta prism (see FIG. 17) with an optical grade cement or by optical contacting. For optical beams entering and exiting the thirteenth embodiment that are in the ultra violet, the preferred attachment method for the optical flats is optical contacting. Before cementing or optical contacting the optical flats, multi-layer thin film coatings are applied to the surfaces of the optical flats and/or corresponding surfaces of the Porro prism and the penta prism so that after the cementing or contacting procedure, the respective interfaces become polarizing surfaces for the eigenmodes of polarization preserving retroreflector.

The polarizing properties of corresponding portions of the polarizing surfaces are chosen so that for an eigenmode reflected (transmitted) by a portion of polarizing interface 1223 of the polarizing beam splitter, the corresponding portions of the polarizing surfaces of the polarization preserving optical system preferably reflect (reflect) the eigenmode. As a consequence, the polarizing surfaces serve as "polarization filters" in that the polarizing surfaces transmit spurious beams generated by the reflection (transmission) of unwanted beams by polarizing interface 1223 of the polarizing beam splitter.

It will be evident on examination of respective figures that the polarizing beam splitter and the polarizing preserving optical system of the thirteenth embodiment comprise subsystems of the sixth, seventh, eighth, ninth, ten, eleventh, and twelfth embodiments of the present invention.

The polarization filtering properties of polarization preserving optical systems may also be augmented and/or achieved by replacing one or more components of the polarization preserving optical systems with corresponding components made from birefringent mediums, e.g. quartz, calcite, or lithium niobate, such that the corresponding components become polarizers.

Figure 18:
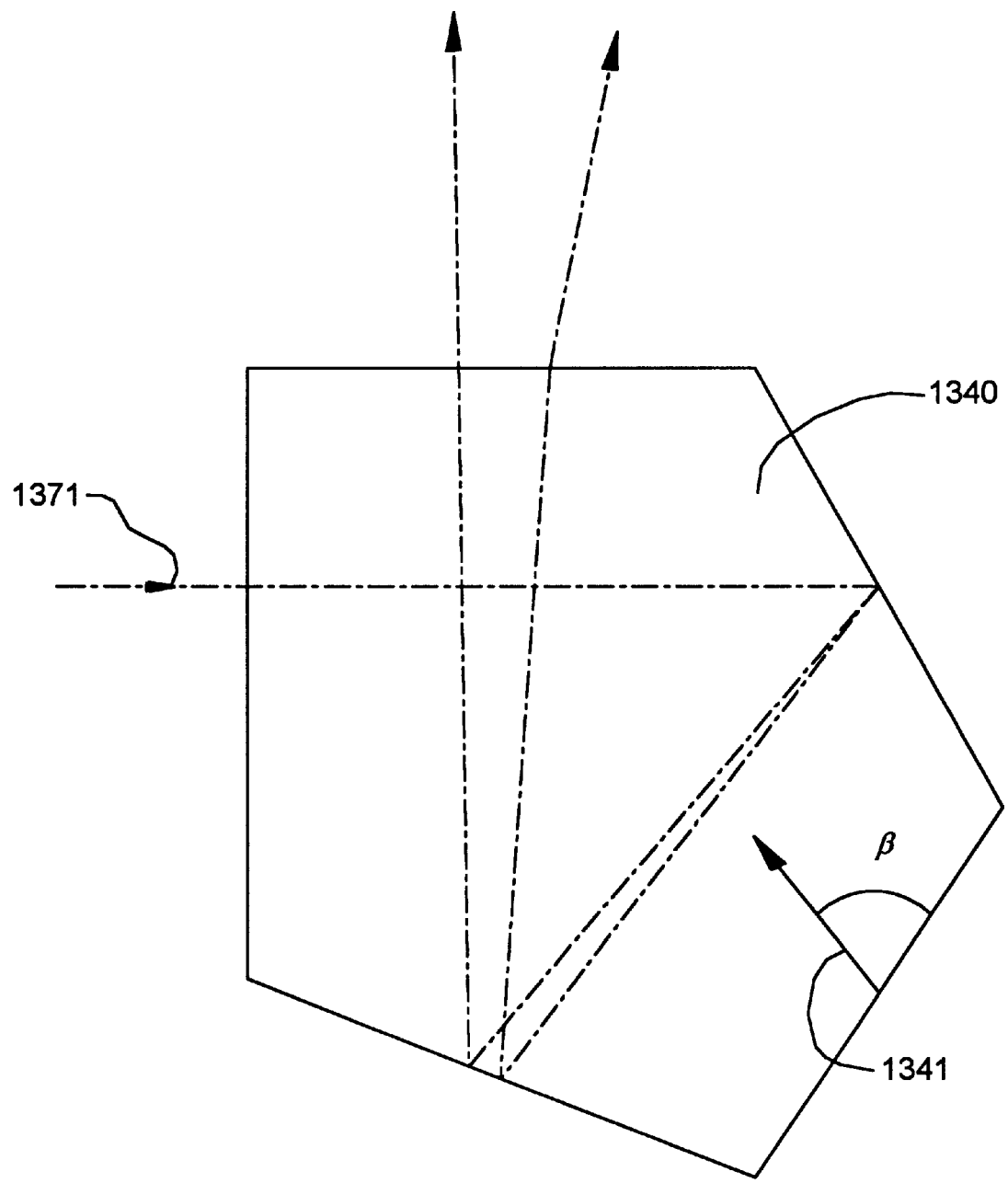
FIG. 18 is a diagrammatic elevational view of a penta prism formed of a birefringent element illustrating its ability of receiving an incoming beam having two coextensive orthogonally polarized components and separating it into two outgoing orthogonally polarized beams that have different directions of propagation and are spatially separate.

A penta prism polarizer 1340 is shown in FIG. 18 comprising a birefringent medium. The optic-axis 1341 of the birefringent medium is parallel to the plane of FIG. 18 and orientated at an angle $\beta$ to a surface of modified penta prism 1340 as shown in FIG. 18. The orientation of the surfaces of the penta prism and the angle $\beta$ are selected so that a desired polarization component of an input beam propagates through the penta prism and exits the penta prism as a polarization preserving eigenmode of the penta prism which comprises polarization filtering. An example of penta prism polarizer is described in an article by H. Lotem and K. Rabinovitch entitled "Penta prism laser polarizer" in *Appl. Optics* 32(12) pp 2017–2020 (1993).

An optical system exhibiting polarization preserving eigenmodes and further comprising polarization filtering can be employed to produce interferometers that work simultaneously at two widely separated wavelengths, in particular two harmonically related wavelengths. The measurement and reference paths for the two wavelengths can be coextensive in respective portions of the interferometer, in particular at a polarizing beam splitter interface, with significantly reduced sources of cyclic errors for both wavelengths compared to sources of cyclic errors in prior art interferometers.

The interferometry systems described above can be especially useful in lithography applications used for fabricating large scale integrated circuits such as computer chips and the like. Lithography is the key technology driver for the semiconductor manufacturing industry. Overlay improvement is one of the five most difficult challenges down to and below 100 nm line widths (design rules), see for example the *Semiconductor Industry Roadmap*, p82 (1997). Overlay depends directly on the performance, i.e. accuracy and precision, of the distance measuring interferometers used to position the wafer and reticle (or mask) stages. Since a lithography tool may produce $50–100 M/year of product, the economic value from improved performance distance measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the photoresist that convert the radiation pattern into a latent image within the photoresist.

The interferometry systems described above are important components of the positioning mechanisms that control the position of the wafer and reticle, and register the reticle image on the wafer.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes photoresist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which are incorporated herein by reference.

The interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, the interferometry systems can be used to measure the position of any one component of the exposure system relative to any other component of the exposure system in which the interferometry system is attached, or supported by one of the components and the measurement object is attached, or is supported by the other of the components.

Figure 19A:
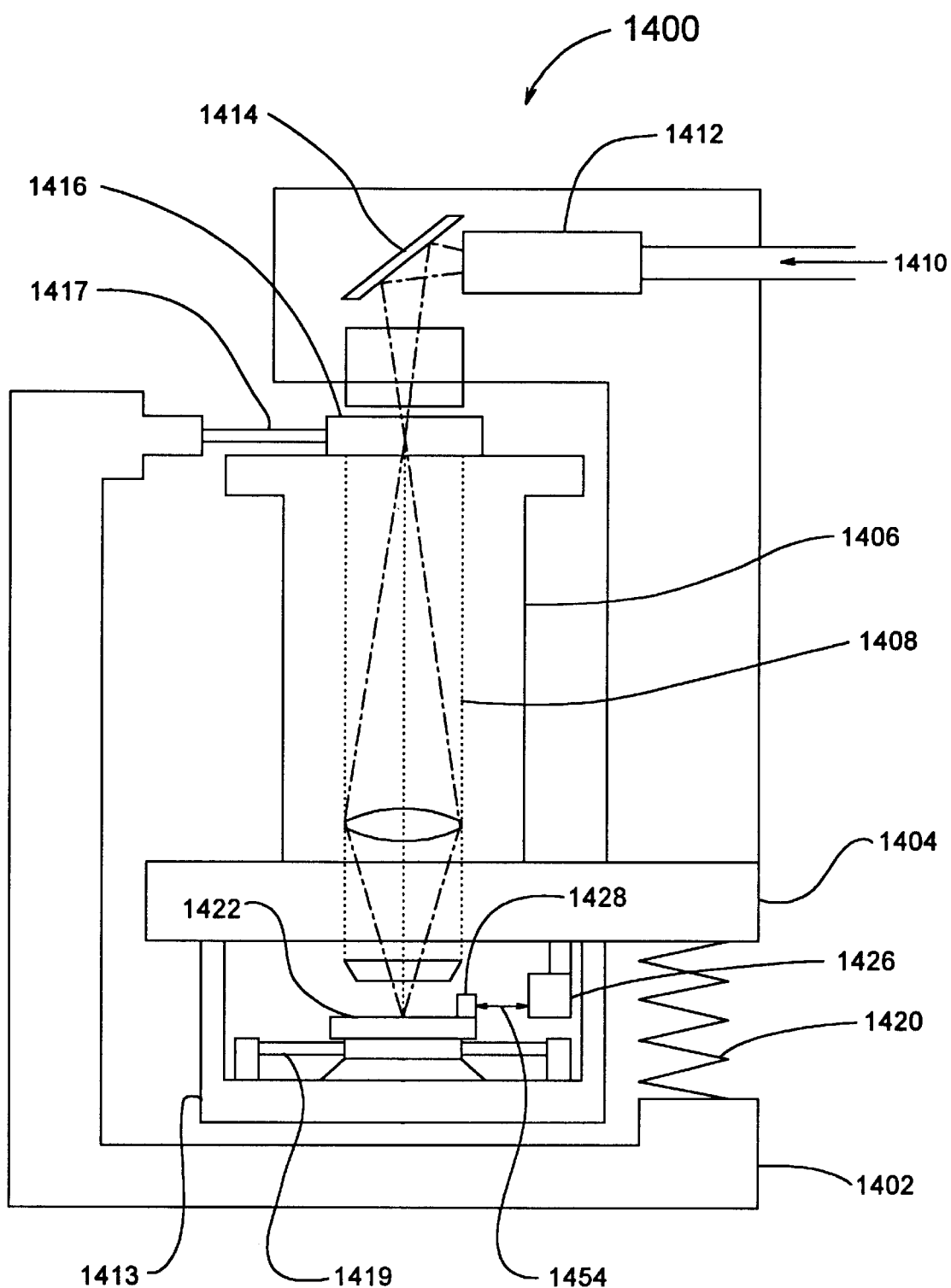

An example of a lithography scanner 1400 using an interferometry system 1426 is shown in FIG. 19a. The interferometry system is used to precisely measure the position of a wafer within an exposure system. Here, stage 1422 is used to position the wafer relative to an exposure station. Scanner 1400 comprises a frame 1402, which carries other support structures and various components carried on those structures. An exposure base 1404 has mounted on top of it a lens housing 1406 atop of which is mounted a reticle or mask stage 1416 used to support a reticle or mask. A positioning system for positioning the mask relative to the exposure station is indicated schematically by element 1417. Positioning system 1417 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 1404 is a support base 1413 that carries wafer stage 1422. Stage 1422 includes a plane mirror for reflecting a measurement beam 1454 directed to the stage by interferometry system 1426. A positioning system for positioning stage 1422 relative to interferometry system 1426 is indicated schematically by element 1419. Positioning system 1419 can include, e.g., piezoelectric transducer elements and corresponding control electronics. The measurement beam reflects back to the interferometry system, which is mounted on exposure base 1404. The interferometry system can be any of the embodiments described previously.

During operation, a radiation beam 1410, e.g., an ultraviolet (UV) beam from a UV laser (not shown), passes through a beam shaping optics assembly 1412 and travels downward after reflecting from mirror 1414. Thereafter, the radiation beam passes through a mask (not shown) carried by mask stage 1416. The mask (not shown) is imaged onto a wafer (not shown) on wafer stage 1422 via a lens assembly 1408 carried in a lens housing 1406. Base 1404 and the various components supported by it are isolated from environmental vibrations by a damping system depicted by spring 1420.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In addition, the lithographic scanner can include a column reference in which interferometry system 1426 directs the reference beam to lens housing 1406 or some other structure that directs the radiation beam rather than a reference path internal to the interferometry system. The interference signal produce by interferometry system 1426 when combining measurement beam 1454 reflected from stage 1422 and the reference beam reflected from lens housing 1406 indicates changes in the position of the stage relative to the radiation beam. Furthermore, in other embodiments the interferometry system 1426 can be positioned to measure changes in the position of reticle (or mask) stage 1416 or other movable components of the scanner system. Finally, the interferometry systems can be used in a similar fashion with lithography systems involving steppers, in addition to, or rather than, scanners.

Figure 19B:
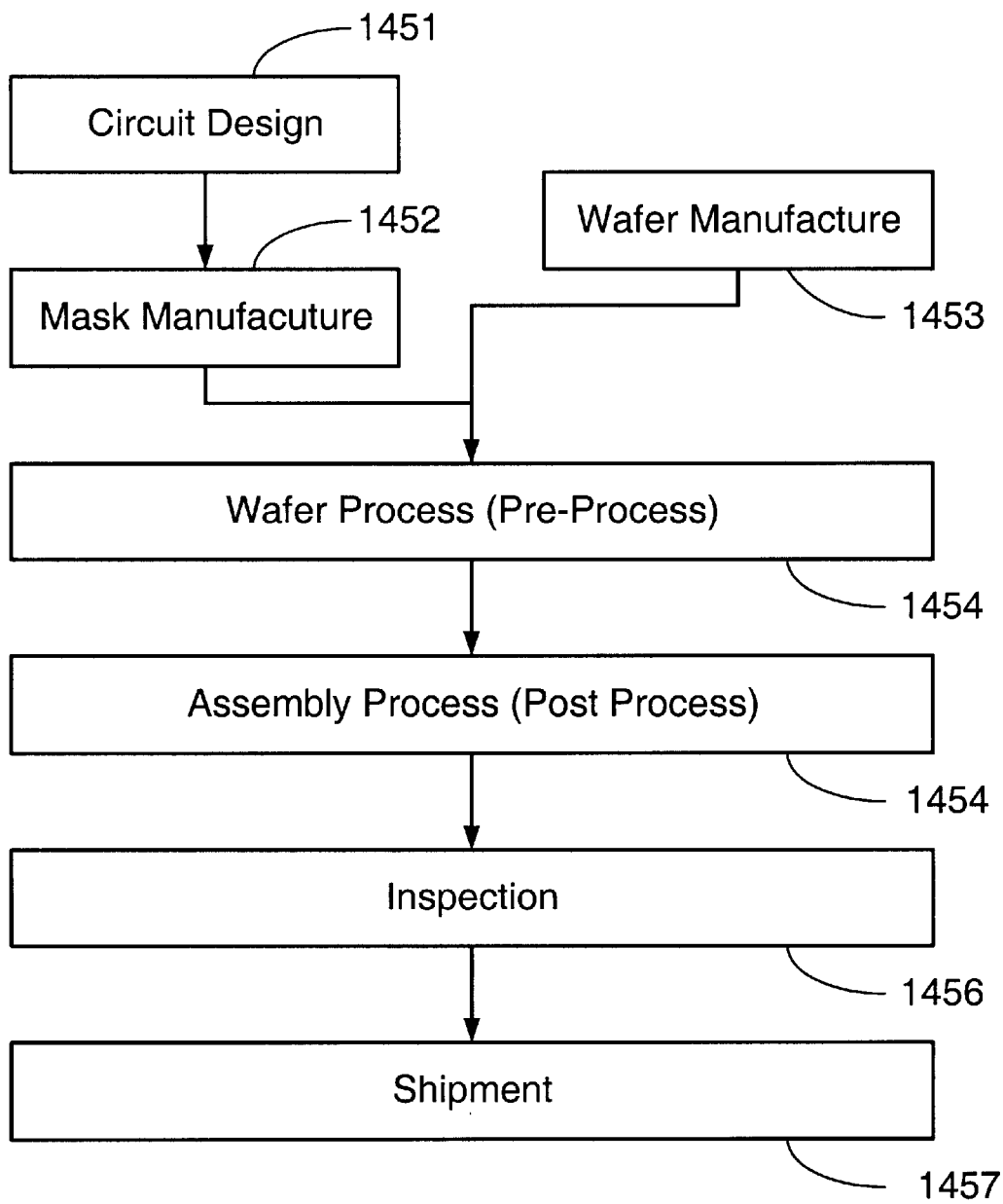

As is well known in the art, lithography is a critical part of manufacturing methods for making semiconducting devices. For example, U.S. Pat. No. 5,483,343 outlines steps for such manufacturing methods. These steps are described below with reference to FIGS. 19b and 19c. FIG. 19b is a flow chart of the sequence of manufacturing a semiconductor device such as a semiconductor chip (e.g. IC or LSI), a liquid crystal panel or a CCD. Step 1451 is a design process for designing the circuit of a semiconductor device. Step 1452 is a process for manufacturing a mask on the basis of the circuit pattern design. Step 1453 is a process for manufacturing a wafer by using a material such as silicon.

Step 1454 is a wafer process which is called a pre-process wherein, by using the so prepared mask and wafer, circuits are formed on the wafer through lithography. Step 1455 is an assembling step, which is called a post- process wherein the wafer processed by step 1454 is formed into semiconductor chips. This step includes assembling (dicing and bonding) and packaging (chip sealing). Step 1456 is an inspection step wherein operability check, durability check, and so on of the semiconductor devices produced by step 1455 are carried out. With these processes, semiconductor devices are finished and they are shipped (step 1457).

Figure 19C:
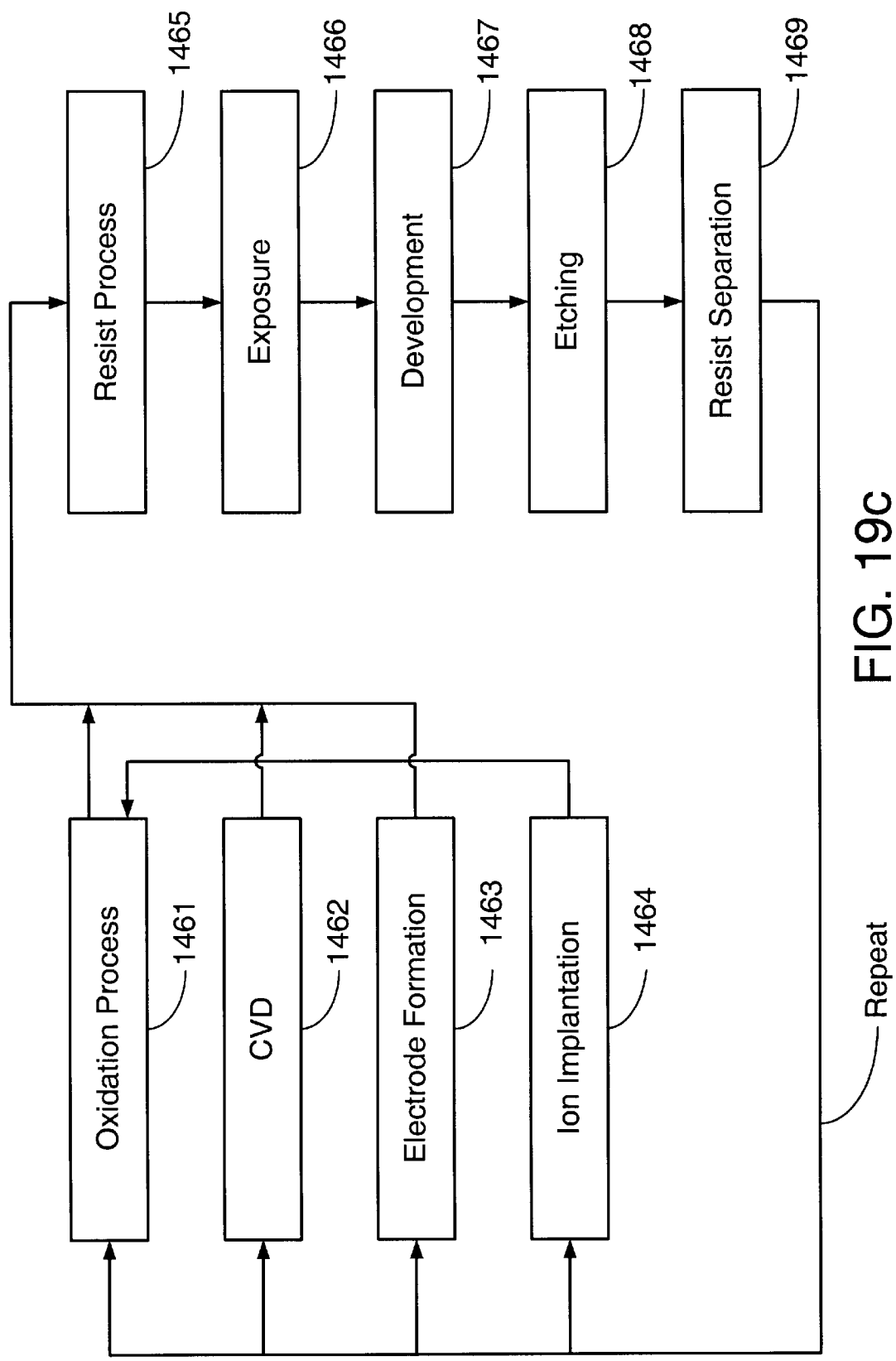

FIG. 19c is a flow chart showing details of the wafer process. Step 1461 is an oxidation process for oxidizing the surface of a wafer. Step 1462 is a CVD process for forming an insulating film on the wafer surface. Step 1463 is an electrode forming process for forming electrodes on the wafer by vapor deposition. Step 1464 is an ion implanting process for implanting ions to the wafer. Step 1465 is a photoresist process for applying a photoresist (photosensitive material) to the wafer. Step 1466 is an exposure process for printing, by exposure, the circuit pattern of the mask on the wafer through the exposure apparatus described above. Step 1467 is a developing process for developing the exposed wafer. Step 1468 is an etching process for removing portions other than the developed photoresist image. Step 1469 is a photoresist separation process for separating the photoresist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 20:
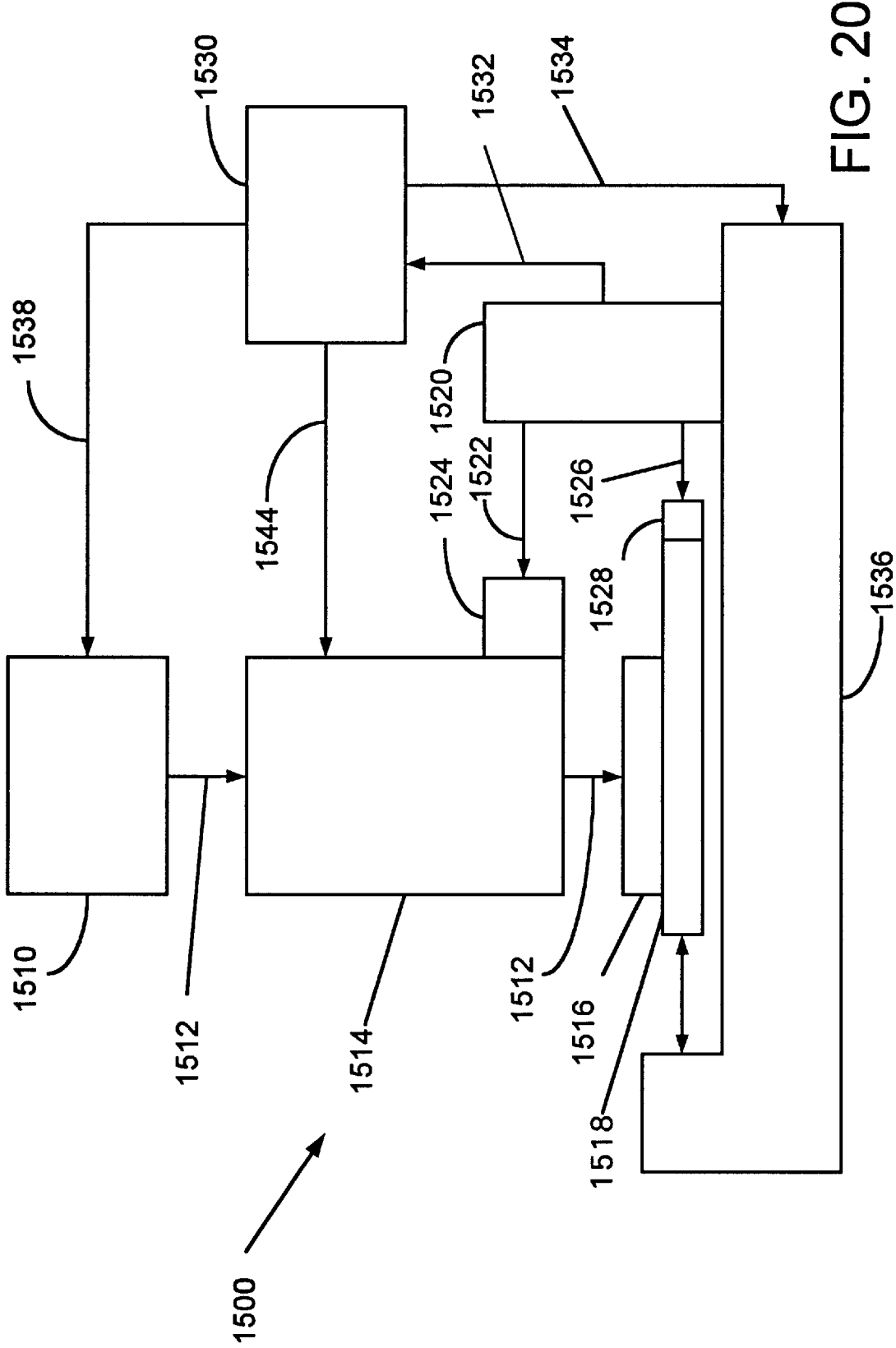
FIG. 20 is a schematic of a beam writing system employing the interferometry system.

As an example, a schematic of a beam writing system 1500 is shown in FIG. 20. A source 1510 generates a write beam 1512, and a beam focusing assembly 1514 directs the radiation beam to a substrate 1516 supported by a movable stage 1518. To determine the relative position of the stage, an interferometry system 1520 directs a reference beam 1522 to a mirror 1524 mounted on beam focusing assembly 1514 and a measurement beam 1526 to a mirror 1528 mounted on stage 1518. Interferometry system 1520 can be any of the interferometry systems described previously. Changes in the position measured by the interferometry system correspond to changes in the relative position of write beam 1512 on substrate 1516. Interferometry system 1520 sends a measurement signal 1532 to controller 1530 that is indicative of the relative position of write beam 1512 on substrate 1516. Controller 1530 sends an output signal 1534 to a base 1536 that supports and positions stage 1518. In addition, controller 1530 sends a signal 1538 to source 1510 to vary the intensity of, or block, write beam 1512 so that the write beam contacts the substrate with an intensity sufficient to cause photophysical or photochemical change only at selected positions of the substrate. Furthermore, in some embodiments, controller 1530 can cause beam focusing assembly 1514 to scan the write beam over a region of the substrate, e.g., using signal 1544. As a result, controller 1530 directs the other components of the system to pattern the substrate. The patterning is typically based on an electronic design pattern stored in the controller. In some applications the write beam patterns a photoresist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics for focusing and directing the radiation to the substrate.

It is understood that while the invention has been described in conjunction with the detailed description thereof, the foregoing description is intended to illustrate and not limit the scope of the invention, which is defined by the scope of the appended claims.

What is claimed is:

1. Polarization interferometric apparatus, said apparatus comprising interferometer means for receiving at least two beams having orthogonal states of polarization and providing first and second interferometer legs, separating said two beams for travel along said first and second interferometer legs, respectively, and generating exit beams containing information about the respective differences in the optical paths each beam experienced in traveling said first and second interferometer legs, said first and second interferometer legs having optical paths structured and arranged such that at least one of them has a variable physical length, the optical path length difference between said first and second interferometer legs varying in accordance with the difference between the respective physical lengths of their optical paths and wherein at least one of said first and second interferometer legs comprises a polarization preserving optical system structured and arranged to deviate plane polarized beams through preselected angles while maintaining their linear polarization as they travel along said at least one of said first and second interferometer legs.

2. The polarization interferometric apparatus of claim 1 further including means for combining said exit beams to produce mixed optical signals containing information corresponding to the phase differences between each of said exit beams from corresponding ones of said predetermined optical paths of said first and second interferometer legs.

3. The polarization interferometric apparatus of claim 2 further including means for detecting said mixed optical signals and generating electrical interference signals containing information corresponding to the difference in physical path lengths of said interferometer legs and their relative rate of change.

4. The polarization interferometric apparatus of claim 3 further including electronic means for analyzing said electrical interference signals.

5. The polarization-interferometric apparatus of claim 1 wherein said polarization preserving optical system comprises a plurality of reflecting surfaces arranged such that a change in the direction of propagation of an input beam, normal to both the input beam and an output beam, causes a change in the direction of propagation of the output beam in a direction opposite to the direction of the change in the input beam, and a change in the direction of propagation of the input beam, normal to the input beam and in a plane orthogonal to a normal to both the input beam and the output beam, causes a rotation in the output beam in said plane that is the same as a corresponding rotation of the input beam caused by the change in the direction of propagation of the input beam and wherein the plane of incidence at each of said reflecting surfaces is either orthogonal or parallel to the plane of polarization of an incident beam thereto.

6. The polarization interferometric apparatus of claim 1 wherein said interferometer means comprises at least one polarizing beam splitter for separating orthogonally polarized beams for travel along corresponding ones of said first and second interferometer legs.

7. The polarization interferometric apparatus of claim 1 wherein said interferometer means comprises at least one plane mirror in one of said interferometer legs.

8. The polarization interferometric apparatus of claim 7 wherein said interferometer means comprises at least two polarization preserving optical systems, one for reflecting beams corresponding to one interferometer leg and another for reflecting beams corresponding to said other interferometer leg.

9. The polarization interferometric apparatus of claim 8 wherein said interferometer means further comprises a polarization beam splitter for separating orthogonally polarized beams and one of each of said at least two polarization preserving optical systems is arranged on opposite sides of said polarizing beam splitter.

10. The polarization interferometric apparatus of claim 1 wherein said interferometer means comprises a plurality of optical elements, which include said polarization preserving optical system, composed of glass and arranged such that said separated beams traveling along said first and second interferometer legs travel through said optical elements composed of glass over substantially equal optical path lengths to compensate for thermal effects.

11. The polarization interferometric apparatus of claim 10 wherein said plurality of optical elements include a polarizing beam splitter having an entrance facet, an exit facet, a top facet, and a bottom facet, a first fixed plane mirror arranged above and substantially parallel to said top facet, a first quarter-wave plate located intermediate said first plane mirror and said top facet, a second movable plane mirror arranged substantially parallel to and opposite to said exit facet, a second quarter-wave plate fixedly located intermediate said second plane mirror and said exit facet, and wherein said polarization preserving optical system is arranged opposite to said bottom facet.

12. The polarization interferometric apparatus of claim 10 wherein said plurality of optical elements include a polarizing beam splitter having an entrance facet, an exit facet, a top facet, and a bottom facet, a first quarter-wave plate located immediately adjacent said exit facet, a first fixed plane mirror arranged opposite to and substantially parallel to said quarter-wave plate, a second movable plane mirror arranged substantially parallel to and adjacent said first fixed plane mirror, a pair of half-wave plates located opposite and substantially parallel to said entrance facet, and wherein said polarization preserving optical system is arranged opposite to said bottom facet, said first and second plane mirrors being moveable relative to one another such that opposing surfaces thereof may contact one another to form a substantially zero air gap between them.

13. The polarization interferometric apparatus of claim 10 wherein said plurality of optical elements include a polarizing beam splitter having an entrance facet, an exit facet, a top facet, and a bottom facet, a first fixed plane mirror arranged above and substantially perpendicular to said top facet, a first quarter-wave plate located intermediate said first plane mirror and said top facet, a 45 degree mirror arranged between said first quarter-wave plate and said first plane mirror, a second movable plane mirror arranged substantially parallel to and opposite to said exit facet, a second quarter-wave plate fixedly located intermediate said second plane mirror and said exit facet, and wherein said polarization preserving optical system is arranged opposite to said bottom facet, said first and second plane mirrors being substantially parallel to one another.

14. The polarization interferometric apparatus of claim 1 wherein said interferometer means is further configured for receiving a second set of two beams and providing a second set of first and second interferometer legs, offset with respect to one another, separating said two beams for travel along said second set of said first and second interferometer legs, respectively, and generating exit beams containing information about the respective differences in the optical paths each beam experienced in traveling said second set of said first and second interferometer legs, said second set of said first and second interferometer legs having optical paths structured and arranged such that at least one of them has a variable physical length, the optical path length difference between said second set of said first and second interferometer legs varying in accordance with the difference between the respective physical lengths of their optical paths and wherein at least one of said second set of first and second interferometer legs comprises a second polarization preserving optical system to reduce polarization mixing between said second set of two beams, whereby said polarization interferometric apparatus is capable of measuring linear and angular displacements.

15. The polarization interferometric apparatus of claim 1 further including means for generating at least two beams having orthogonal states of polarization.

16. The polarization interferometric apparatus of claim 15 wherein said two beams have different wavelengths.

17. The polarization interferometric apparatus of claim 16 wherein said different wavelengths are harmonically related.

18. The polarization interferometric apparatus of claim 1 wherein said orthogonally polarized beams are spatially separated.

19. The polarization interferometric apparatus of claim 1 wherein said orthogonally polarized beams travel along a coextensive path.

20. The polarization interferometric apparatus of claim 5 wherein said polarization preserving optical system is fabricated of a plurality of prismatic optical elements wherein said plurality of reflecting surfaces comprise selected surfaces of said plurality of prismatic optical elements.

21. The polarization interferometric apparatus of claim 20 wherein at least one of said surfaces of said plurality of prismatic optical elements operates by total internal reflection.

22. The polarization interferometric apparatus of claim 20 wherein said plurality of prismatic optical elements comprise an integral assembly in which at least one surface of each prismatic optical element contacts at least one surface of another of said prismatic optical elements.

23. The polarization interferometric apparatus of claim 20 further including at least one polarizing beam splitter.

24. The polarization interferometric apparatus of claim 22 wherein said integral assembly further comprises at least one polarizing beam splitter.

25. The polarization interferometric apparatus of claim 20 wherein said prismatic elements of said optical system comprise at least one prismatic element selected from the group consisting of Porrof right, Dove, penta, and "K" prisms.

26. The polarization interferometric apparatus of claim 20 wherein said prismatic elements include a right, a Porro and a penta prism.

27. The polarization interferometric apparatus of claim 5 wherein at least one of said plurality of said reflecting surfaces comprises a mirror.

28. The polarization interferometric apparatus of claim 5 wherein at least one of said plurality of reflecting surfaces has formed thereon a multilayer polarizing beam splitter coating arrangement to enhance the extinction ratio between orthogonally polarized beams entering said polarization preserving optical system from upstream of it.

29. The polarization interferometric apparatus of claim 20 wherein at least one of said plurality of prismatic optical elements is formed of a birefringent optical material.

30. The polarization interferometric apparatus of claim 5 wherein said plurality of reflecting surfaces are configured and arranged with respect to one another such that beams enter and exit said polarization preserving optical system substantially parallel and offset with respect to one another.

31. The polarization interferometric apparatus of claim 5 wherein said plurality of reflecting surfaces are configured and arranged with respect to one another such that beams enter and exit said polarization preserving optical system substantially at right angles to one another.

32. The polarization interferometric apparatus of claim 31 wherein said plurality of reflecting surfaces are further configured and arranged with respect to one another such that beams that enter and exit said polarization preserving optical system substantially at right angles to one another also reside in planes that are offset with respect to one another.

33. The polarization interferometric apparatus of claim 30 wherein said plurality of reflecting surfaces are further configured and arranged with respect to one another such that an array of entering beams to said polarization preserving optical system exit it as an array of exiting beams substantially parallel to said array of entering beams, said array of entering beams being offset with respect to said array of exiting beams with both residing in the same plane.

34. The polarization interferometric apparatus of claim 30 wherein said plurality of reflecting surfaces are further configured and arranged with respect to one another such that an array of entering beams to said polarization preserving optical system exit it as an array of exiting beams substantially parallel to said array of entering beams, said array of entering beams residing in planes that are offset with respect to one another.

35. The polarization interferometric apparatus of claim 5 wherein said plurality of reflecting surfaces are configured and arranged with respect to one another such that beams enter and exit said polarization preserving optical system at preselected angles other than 180 degrees.

36. The polarization interferometric apparatus of claim 20 wherein said plurality of prismatic optical elements comprises, in sequence from entering to exiting light beams, a Porro prism and a right angle prism.

37. The polarization interferometric apparatus of claim 20 wherein said plurality of prismatic optical elements comprises, in sequence from entering to exiting light beams, a Porro prism and a Dove prism.

38. The polarization interferometric apparatus of claim 20 wherein said plurality of prismatic optical elements comprises, in sequence from entering to exiting light beams, a right angle prism, Porro prism and a penta prism.

39. The polarization interferometric apparatus of claim 38 wherein one facet of said right angle prism serves as an entrance facet and one facet of said penta prism serves as an exit facet, said entrance and said exit facets being parallel to one another.

40. The polarization interferometric apparatus of claim 39 further including at least one polarizing beam splitter arranged upstream of said entrance facet of said right angle prism.

41. The polarization interferometric apparatus of claim 40 wherein one surface of said polarizing beam splitter and said entrance surface of said right angle prism are in optical contact with one another.

42. The polarization interferometric apparatus of claim 1 further including in at least one of said interferometer legs retardation elements for controlling the state of polarization of orthogonally polarized beams and reducing the effects of ghost reflections on exit beams.

43. The polarization interferometric apparatus of claim 42 wherein said retardation elements comprise a pair of quarter wave plates oppositely tilted with respect to one another.

44. The polarization interferometric apparatus of claim 1 wherein said interferometer means is further structured and arranged such that the orthogonally polarized beams make at least a double pass in traveling along said interferometer legs.

45. The polarization interferometric apparatus of claim 1 further including a microlithographic means operatively associated with said interferometric apparatus for fabricating integrated circuits on wafers, said microlithographic means comprising:

at least one stage;

an illumination system for imaging spatially patterned radiation onto the wafer; and at least one positioning system for adjusting the position of said at least one stage;

wherein said interferometric apparatus is adapted to measure the position of said at least one stage.

46. The polarization interferometric apparatus of claim 1 further including a microlithographic means operatively associated with said interferometric apparatus for use in fabricating integrated circuits on a wafer, said microlithographic means comprising:

at least one stage for supporting a wafer;

an illumination system including a radiation source, a mask, a positioning system, a lens assembly, and predetermined portions of said interferometric apparatus, said microlithographic means being operative such that the source directs radiation through said mask to produce spatially patterned radiation, said positioning system adjusts the position of said mask relative to radiation from said source, said lens assembly images said spatially patterned radiation onto the wafer, and said interferometric apparatus measures the position of said mask relative to said radiation from said source.

47. The polarization interferometric apparatus of claim 1 further including microlithographic apparatus operatively associated with said interferometric apparatus for fabricating integrated circuits comprising first and second components, said first and second components being moveable relative to one another, said first and second components being connected with said first and second measurement legs, moving in concert therewith, such that said interferometric apparatus measures the position of said first component relative to said second component.

48. The polarization interferometric apparatus of claim 1 further including a beam writing system operatively associated with said interferometric apparatus for use in fabricating a lithography mask, said beam writing system comprising:

a source for providing a write beam to pattern a substrate;

at least one stage for supporting a substrate;

a beam directing assembly for delivering said write beam to the substrate; and a positioning system for positioning said at least one stage and said beam directing assembly relative to one another, said interferometric apparatus being adapted to measure the position of said at least one stage relative to said beam directing assembly.

49. Polarization interferometric apparatus, said apparatus comprising interferometer means for receiving at least two beams having orthogonal states of polarization and providing first and second interferometer legs, separating said two beams for travel along said first and second interferometer legs, respectively, and generating exit beams containing information about the respective differences in the optical paths each beam experienced in traveling said first and second interferometer legs, said first and second interferometer legs having optical paths structured and arranged such that at least one of them has a variable physical length, the optical path length difference between said first and second interferometer legs varying in accordance with the difference between the respective physical lengths of their optical paths, said interferometer means further including a Polarization preserving optical system located in at least one of said first and second interferometer legs and structured and arranged to deviate plane polarized beams through preselected angles while maintaining their linear polarization as they travel along said at least one of said first and second interferometer legs and a plurality of differently tilted retardation elements to reduce the effects of ghost beams on exit beams.

50. The polarization interferometric apparatus of claim 49 wherein said plurality of differently tilted retardation elements comprise a pair of oppositely tilted quarter-wave plates.

51. The polarization interferometric apparatus of claim 1 wherein said interferometer means further includes dynamic means for maintaining the alignment of at least one of said beams as it travels along a corresponding one of said interferometer legs.

52. The polarization interferometric apparatus of claim 51 wherein interferometer means comprises at least one plane mirror for receiving one of said beams and said dynamic means comprises a servo controlled mirror for maintaining said beam substantially orthogonal to said plane mirror.

53. The polarization interferometric apparatus of claim 1 wherein said interferometer means is further configured and arranged for receiving at least two additional beams having orthogonal states of polarization and providing two additional first and second interferometer legs, separating said two additional beams for travel along said two additional first and second interferometer legs, respectively, and generating additional exit beams containing information about the respective differences in the optical paths each said additional beam experienced in traveling said additional first and second interferometer legs, said additional first and second interferometer legs having optical paths structured and arranged such that at least one of them has a variable physical length, the optical path length difference between said additional first and second interferometer legs varying in accordance with the difference between the respective physical lengths of their optical paths and wherein at least one of said additional first and second interferometer legs comprises a polarization preserving optical system.

54. The polarization interferometric apparatus of claim 53 wherein said interferometer means is configured to simultaneously determine displacement and/or angle along at least two axes.

* * * * *